United States Patent
Kodikara Patabandi et al.

(10) Patent No.: US 8,140,086 B2
(45) Date of Patent: *Mar. 20, 2012

(54) INITIAL CONNECTION ESTABLISHMENT IN A WIRELESS COMMUNICATION SYSTEM

(75) Inventors: Chandrika K. Kodikara Patabandi, Chippenham (GB); Nicholas William Anderson, Bristol (GB)

(73) Assignee: Wireless Technology Solutions LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,250

(22) Filed: Mar. 14, 2011

(65) Prior Publication Data

US 2011/0165880 A1    Jul. 7, 2011

Related U.S. Application Data

(63) Continuation of application No. 11/330,820, filed on Jan. 11, 2006, now Pat. No. 7,912,471, which is a continuation-in-part of application No. 11/325,829, filed on Jan. 4, 2006, now abandoned.

(51) Int. Cl.
    *H04W 72/00* (2009.01)
(52) U.S. Cl. .................................................. 455/450
(58) Field of Classification Search ................... None
    See application file for complete search history.

(56) References Cited

U.S. PATENT DOCUMENTS

| | | | |
|---|---|---|---|
| 6,934,556 B2 * | 8/2005 | Takano | 455/522 |
| 6,987,982 B2 | 1/2006 | Willenegger et al. | |
| 7,062,272 B2 | 6/2006 | Grilli et al. | |
| 7,158,795 B2 | 1/2007 | Zhang et al. | |
| 7,171,212 B2 | 1/2007 | Kim et al. | |
| 7,203,204 B2 | 4/2007 | Carneal et al. | |
| 7,376,110 B2 | 5/2008 | Honkasalo et al. | |
| 7,620,367 B2 | 11/2009 | Anderson | |
| 7,912,471 B2 | 3/2011 | Kodikara Patabandi et al. | |
| 7,979,072 B2 * | 7/2011 | Senarath et al. | 455/442 |
| 2003/0210674 A1 | 11/2003 | Honkasalo et al. | |

(Continued)

FOREIGN PATENT DOCUMENTS

| WO | WO 01/89235 | 11/2001 |
|---|---|---|
| WO | WO 2004/102837 | 11/2004 |

OTHER PUBLICATIONS

Universal Mobile Telecommunications System (UMTS); RRC Protocol; Specification (3G TS 25.331 version 3.1.0 release 1999), (Jan. 2000). ETSI TS 125.331 v3.1.0:1-282.

(Continued)

*Primary Examiner* — Thang Tran
*Assistant Examiner* — Huy D Nguyen
(74) *Attorney, Agent, or Firm* — Fitch Even Tabin & Flannery

(57) ABSTRACT

A method, user equipment, network equipment and a system for initiating a wireless connection and subsequent communication over a shared physical resource in a wireless communication system between user equipment and network equipment comprising: processing a UE-derived temporary identifier; determining a set of channels that the user equipment will monitor; implicitly or explicitly communicating this channel set; communicating the temporary identifier as an identifier to the network equipment; communicating a downlink message on a channel belonging to the determined channel set conveying the temporary identifier and a description of a scheduled resource on a shared channel, the scheduled resource comprising a resource allocated to the user equipment by the network equipment; and communicating data on the scheduled resource in response to the downlink message.

42 Claims, 15 Drawing Sheets

U.S. PATENT DOCUMENTS

| | | |
|---|---|---|
| 2003/0211846 A1 | 11/2003 | Nagpal et al. |
| 2003/0224794 A1 | 12/2003 | Kim et al. |
| 2004/0057387 A1 | 3/2004 | Yi et al. |
| 2004/0185837 A1 | 9/2004 | Kim et al. |
| 2005/0070320 A1 | 3/2005 | Dent |
| 2005/0149649 A1 | 7/2005 | Carneal et al. |
| 2005/0220116 A1 | 10/2005 | Ahn et al. |
| 2006/0035645 A1 | 2/2006 | Kim |
| 2006/0121911 A1 | 6/2006 | Zhang et al. |
| 2006/0246910 A1 | 11/2006 | Petermann |
| 2006/0268792 A1 | 11/2006 | Belcea |
| 2007/0097928 A1 | 5/2007 | Anderson |
| 2007/0271346 A1 | 11/2007 | Vill |
| 2007/0281695 A1 | 12/2007 | Lohr et al. |
| 2008/0004019 A1 | 1/2008 | Grilli et al. |
| 2009/0041024 A1 | 2/2009 | Steudle et al. |
| 2009/0190519 A1 | 7/2009 | Lee et al. |

OTHER PUBLICATIONS

International Search Report and Written Opinion mailed Jul. 5, 2007, for PCT Application No. PCT/EP20071050100 filed Jan. 4, 2007, 12 pages.

International Search Report and Written Opinion mailed Jul. 9, 2007, for PCT Application No. PCT/EP2006/069530 filed Dec. 11, 2006, 12 pages.

U.S. Office Action mailed Aug. 26, 2008, for U.S. Appl. No. 11/330,820, filed Jan. 11, 2006, 7 pages.

Translation of Japanese Office Action Dated Apr. 7, 2011 from Japanese Patent Application No. 2008-548957.

Proposed Liaison to RAN 1 on "Initial Cell Access in LTE," Seoul, Korea, Nov. 7, 2005 through Nov. 11, 2005; Source: Samsung.

RRC Connection Establishment Procedure for E-UTRA, Sophia Antipolis, France, Jan. 9-13, 2006; Source: IPWireless.

\* cited by examiner

Conventional RRC connection procedure
using common channel signalling
in a UTMS system Conventional RRC connection procedure
using common channel signalling
in a UTMS system Scheduled downlink connection procedure Non-scheduled & scheduled uplink,
scheduled downlink Contention based RRC connection procedure
using a shared physical control channel (SPCCH) and
shared transport channels (DL-SCH & UL-SCH)

Scheduled downlink connection & conflict resolution procedure

INITIAL CONNECTION ESTABLISHMENT IN A WIRELESS COMMUNICATION SYSTEM

CROSS-REFERENCE TO RELATED APPLICATIONS

This application is a continuation of and claims the benefit of U.S. patent application Ser. No. 11/330,820, filed on Jan. 11, 2006, which is a continuation of U.S. patent application Ser. No. 11/325,829, filed on Jan. 4, 2006, which is incorporated by reference in its entirety herein.

BACKGROUND OF THE INVENTION

1. Field of the Invention

The present invention relates generally to wireless communication technology, and more particularly to an initial connection procedure between user equipment and network equipment in a wireless communication system.

2. Description of the Related Art

In wireless communication systems there is the need for a logical connection between a mobile station (also referred to as user equipment (UE), a user terminal, a mobile terminal, a wireless data terminal and a cellular phone) and radio access network. The radio access network may comprise one or more base stations (also referred to as a Node B, for example in 3GPP nomenclature) together with one or more radio network controllers (RNCs). The logical connection provides a context for a particular network to UE communication link over which data may be transferred without miscommunication of the data to network elements or UEs in the system that are not intended to take part in the communication.

In the radio access network system defined by 3GPP, the logical connection between the user terminal and the radio access network is defined by radio resource control (RRC) connection states. Two of the main RRC connection states are defined as RRC connected and RRC idle.

If there is a logical connection between the user terminal and the radio access network, then the user terminal is said to be in RRC connected state. The existence of a user terminal in RRC connected state can be determined within a cell or multiple cells. Therefore, the radio resources for a particular user terminal can be managed efficiently by the wireless network. In contrast to RRC connected state, a user terminal in RRC idle state has no logical connection to the wireless access network. Thus, the user terminal in RRC idle state can only be determined within the core network or area that is larger than the cell, such as a location area or routing area.

When the user terminal is initially switched on by the user, a public land mobile network (PLMN) is selected and the user terminal searches for a suitable cell to be camped on to and remains in RRC idle state in the corresponding cell. An initial RRC connection may be initiated either by the network or by the user equipment. For example, in the case of a UE initiated connection for a UE in the RRC idle state, the UE requires an initial connection to the network and sends a RRC connection request message to the network. By means of a further example, in the case of a network initiated connection, an RRC connection request message may also be sent by the UE in response to receipt of a paging message from the network (the network having sent the paging message to the UE to illicit the commencement of an RRC connection procedure).

There are thus a number of reasons for RRC connection request by the UE. For example: (1) Initial cell access: when the UE attempts to make a call, the UE needs to establish an RRC connection; (2) Paging response: when transmitting a response message to a paging message; (3) Cell update: when the UE selects a suitable cell while in idle mode; (4) UTRAN Routing Area (URA) update: when the UE selects a suitable URA while in idle mode; and (5) Multimedia Broadcast and Multicast (MBMS) connection: in order to receive MBMS service and request for MBMS point-to-point connection.

In the conventional RRC connection procedure, the user terminal initiates the connection procedure by transmitting a RRC connection request message to the network using common uplink transport channels. The common uplink transport channels are shared by a plurality of UEs and are used for non-scheduled data transmission.

The network considers the connection request and may return on downlink either an RRC connection setup message (in the event of a successful admission) or an RRC connection reject message (in the event of an unsuccessful admission). In both cases the message is sent using common downlink transport channels which are (similar to the uplink common channels) shared by a plurality of UEs and used for non-scheduled data transmission.

The common transport channel over which messages from the user terminal to the network are transmitted during this initial RRC connection phase are termed random access channels. Random access transmission may similarly be referred to as unscheduled transmissions, as no explicit scheduling or coordination of the transmissions is carried out. Due to this lack of explicit coordination, there exists a probability that one mobile will transmit using the same uplink transmission resources or uplink identity as another user. In this instance, the communication reliability of both transmissions may be compromised due to the mutual logical or actual interference the uplink messages generate at the receiving base station. These cases, in which more than one mobile transmits on a defined set of uplink resources, may be referred to as collisions.

A further description of collisions, unscheduled access and scheduled access may be found in U.S. patent application Ser. No. 11/263,044, filed on Oct. 31, 2005, titled "FREQUENCY DOMAIN UNSCHEDULED TRANSMISSION IN A TDD WIRELESS COMMUNICATIONS SYSTEM" to inventor Nicholas W. ANDERSON, and which is hereby incorporated by reference.

The common downlink transport channels used to convey the corresponding messages from the network to the user terminal are termed forward access channels (FACH).

System resources are typically reserved for these uplink and downlink common transport channels. The radio resources used for common channels are typically separated from the radio resources used for other transport channels. Examples of other types of transport channel comprise dedicated transport channels and shared transport channels. In the case of dedicated transport channels the data is mapped to a sub-set of the total radio resources assigned on a long term basis to a particular user or connection. Conversely, in the case of shared channels, the data for each user is more dynamically mapped to a part of a pool of radio resources assigned within the set of total radio resources under control of a resource scheduler located typically within the MAC layer (layer 2) of the network. The radio resource in this instance is thus shared amongst users and is arbitrated by the scheduler. This is to be contrasted against the case for common channels in which the users share the radio resource but in a non-scheduled manned.

The use of shared channels only can provide benefits in terms of system capacity when compared to the use of multiple channel types within the system (such as mixtures of common, shared and dedicated types) wherein each is assigned for a particular traffic type. This is because, by multiplexing all traffic types onto only shared channels, the scheduler can dynamically adapt the resources assigned to the varying instantaneous loads presented by each traffic type. In contrast, if for example we assign one traffic type exclusively to common channels and another traffic type exclusively to shared channels, then variations in the traffic loads offered by each traffic type cannot be accommodated without reconfiguring the respective portions of the total radio resource space assigned firstly to common and secondly to shared channels. This reconfiguration of radio resources is typically a slow process and the system is therefore unresponsive to fast variations in load. A consequence of this is that in current systems, the fraction of the total radio resource space assigned to common channels often has to be designed with a worst-case consideration in mind and radio resource usage efficiency is therefore suboptimum.

Following a conventional RRC connection establishment procedure, the existence of the UE is known by the network and a shared channel address or UE ID may then be assigned by the network only at the completion of the connection establishment procedure. Therefore, shared channels may only be used after the normal RRC connection procedure has been accomplished using the common channel procedures. A significant portion of the total radio resource space must therefore be pre-assigned to the common channels to carry the connection establishment traffic. The user terminal specific layer 2 connection context used for the shared channel operation can only be established at the completion of the RRC connection procedure.

In addition, known wireless communication systems expend a substantial amount of time and exchange a number of signaling messages on unshared and common channels to establish an initial layer 2 context for shared channel operations and this can contribute to communication delay. Furthermore, the existence of a plurality of channel types and associated protocols, procedures and attributes can significantly increase system implementation complexity.

For the above-mentioned reasons, an improvement to the initial system access and RRC connection procedure is desirable in order to improve radio resource usage efficiency, to reduce communication delay and to simplify system implementation complexity.

BRIEF SUMMARY OF THE INVENTION

Some embodiments of the present invention provide a prompt establishment of a layer 2 shared channel context by allowing the UE to derive its own layer 2 address as a temporary identifier until the network decides to replace the UE-derived temporary identifier with a network selected identifier and allowing the UE to communicate a set of channels that it will monitor for downlink messages from the network. This combination enables the system to utilize shared channels in lieu of common channels at a very early stage of the connection establishment, helps to minimizes the volume of traffic carried on common channels and also assists in conflict avoidance.

Some embodiments of the present invention provide for a method of initiating a wireless connection and subsequent communication over a shared physical resource in a wireless communication system between user equipment and network equipment, the method, by the user equipment, comprising: deriving a temporary identifier; deriving a channel set; transmitting an initial message to the network equipment, the initial message comprising the temporary identifier; receiving a downlink message on a channel belonging to the derived channel set conveying the temporary identifier and a description of a scheduled resource on a shared channel, the scheduled resource comprising a resource allocated to the user equipment by the network equipment; and communicating data on the scheduled resource in response to the downlink message.

Some embodiments of the present invention provide for one or more of the following options in various combinations: the channel set comprises multiple channels; the deriving of the channel set comprises randomly selecting the channel set from a plurality of channel sets; the deriving of the channel set comprises determining the channel set based on a global UE identifier, for example, wherein the global UE identifier comprises one of a temporary mobile subscriber identity (TMSI), an international mobile subscriber identity (IMSI), or an international mobile equipment identity (IMEI); the deriving of the channel set comprises determining the channel set as a function of one or more characteristics of a physical resource, and wherein the transmitting of the initial message comprises transmitting the initial message on the physical resource, for example, wherein the characteristic of the physical resource comprises one or more of a parameter of time, a parameter of frequency, and/or a parameter of a code; the deriving of the channel set comprises determining the channel set based on one or more of a characteristic of a physical resource, a global UE identifier, and the temporary identifier; the initial message further comprises a global UE identifier; further comprising determining a physical resource and wherein the transmitting of the initial message comprises transmitting the initial message in accordance with the determined physical resource; further comprising signaling an indication of the channel set; further comprising implicitly communicating an indication of the channel set; the transmitting of the initial message to the network equipment comprises transmitting a scheduling request message; the transmitting of the initial message to the network equipment comprises transmitting an RRC connection request message; further comprising: timing out after the transmitting the initial message and before the receiving of the downlink message; determining a different physical resource; and retransmitting the initial message on the different physical resource; and/or wherein the wireless communication system comprises an evolved UMTS Terrestrial Radio Access Network (E-UTRAN).

Some embodiments of the present invention provide for user equipment used in initiating a wireless connection and subsequent communication over a shared physical resource in a wireless communication system between the user equipment and network equipment, the user equipment comprising: a memory; a processor coupled to the memory; and program code executable on the processor, the program code operable for: deriving a temporary identifier; deriving a channel set; transmitting an initial message to the network equipment, the initial message comprising the temporary identifier; receiving a downlink message on a channel belonging to the derived channel set conveying the temporary identifier and a description of a scheduled resource on a shared channel, the scheduled resource comprising a resource allocated to the user equipment by the network equipment; and communicating data on the scheduled resource in response to the downlink message.

Some embodiments of the present invention provide for one or more of the following options in various combinations: the deriving of the channel set comprises randomly selecting the channel set from a plurality of channel sets; the deriving of the channel set comprises determining the channel set as a function of one or more characteristics of a physical resource, for example time, frequency and code, and wherein the transmitting of the initial message comprises transmitting the initial message on the physical resource; the transmitting of the temporary identifier to the network equipment includes transmitting the temporary identifier within a first uplink message containing the temporary identifier and a request for the scheduled resource; the deriving of the channel set comprises determining the channel set based on one or more of a characteristic of a physical resource, a global UE identifier, and the temporary identifier; the program code is further operable for determining a physical resource and wherein the transmitting of the initial message comprises transmitting the initial message in accordance with the determined physical resource; and/or the program code is further operable for signaling an indication of the channel set, for example, wherein the program code is further operable for implicitly communicating an indication of the channel set.

Some embodiments of the present invention provide for network equipment used in initiating a wireless connection and subsequent communication over a shared physical resource in a wireless communication system between user equipment and the network equipment, the network equipment comprising: a memory; a processor coupled to the memory; and program code executable on the processor, the program code operable for: receiving an initial message sent by the user equipment; determining a channel set; allocating a scheduled resource to the user equipment, the scheduled resource comprising a resource on a shared channel; transmitting a downlink message on a channel belonging to the determined channel set, the downlink message conveying the temporary identifier and a description of the scheduled resource; and communicating data on the scheduled resource in response to the downlink message.

Some embodiments of the present invention provide for: determining the channel set wherein the determining the channel set comprises extracting a channel indication from the initial message, the channel indication indicating the channel set; or determining the channel set wherein the determining the channel set comprises determining the channel set from the physical resource carrying the initial message.

Some embodiments of the present invention provide for a computer program product comprising program code for initiating a wireless connection and subsequent communication over a shared physical resource in a wireless communication system between user equipment and network equipment, the computer program product comprising program code for: deriving a temporary identifier; deriving a channel set; transmitting an initial message to the network equipment, the initial message comprising the temporary identifier; receiving on a downlink channel belonging to the derived channel set a downlink message conveying the temporary identifier and a description of a scheduled resource on a shared channel, the scheduled resource comprising a resource allocated to the user equipment by the network equipment; and communicating data on the scheduled resource in response to the downlink message.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

The above needs are at least partially met through provision of the INITIAL CONNECTION ESTABLISHMENT IN A WIRELESS COMMUNICATION SYSTEM described in the following detailed description, particularly when studied in conjunction with the drawings, wherein:

FIGS. 3A and 3B illustrate an evolved UTRAN (E-UTRAN) network operating with user equipment and a core network in accordance with the present invention.

Figure 1A:
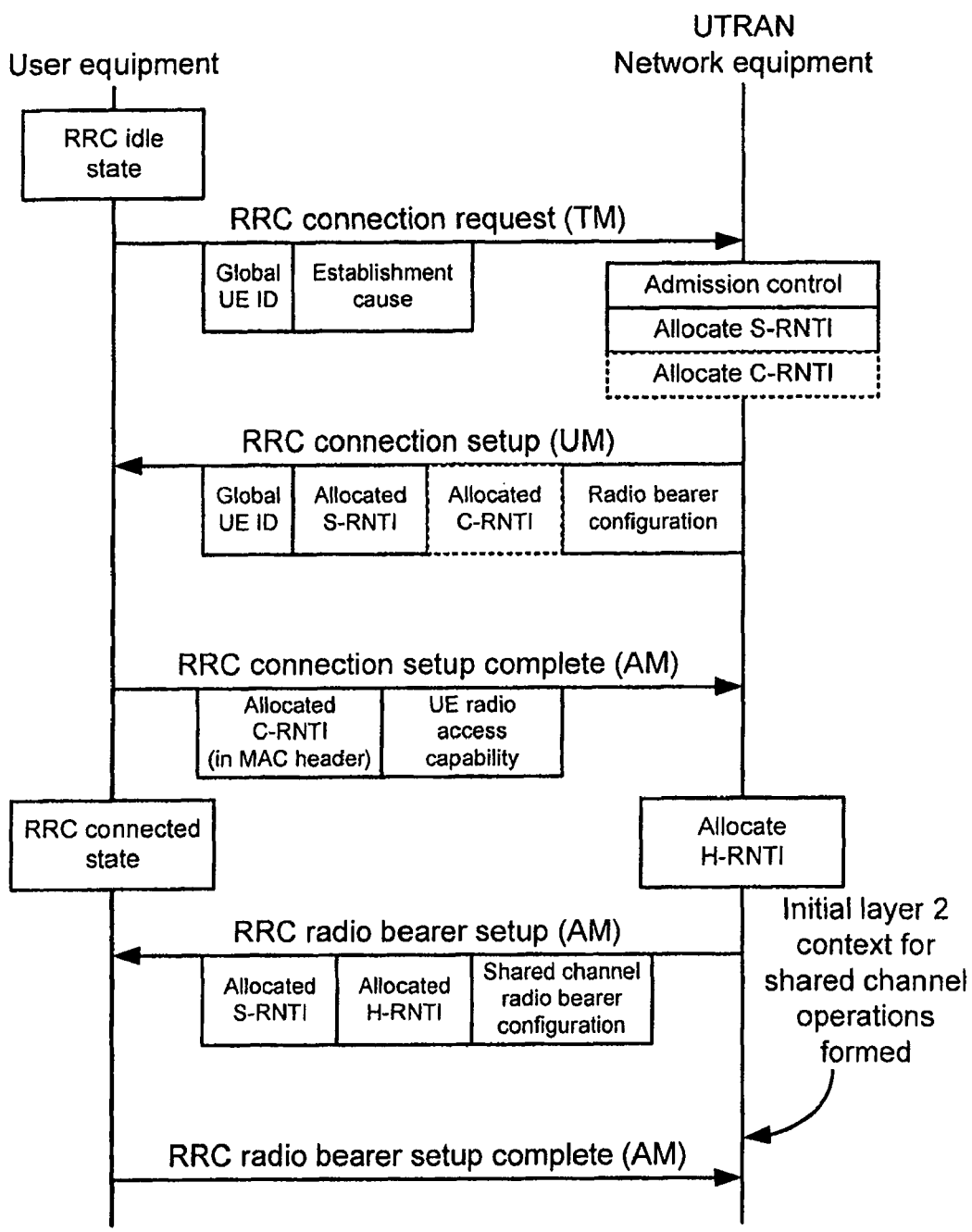
FIGS. 1A and 1B show a conventional sequence of messages for transitioning from an RRC idle state to an RRC connected state in a conventional UMTS system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Though the following figures illustrate the invention with reference to a conventional Universal Mobile Telecommunications System (UMTS system), embodiments of the invention may apply to other wireless radio systems as well. A conventional UMTS system usually includes multiple user equipment (UE), which are sometimes referred to as user terminals, mobile stations, mobile terminals, wireless data terminals and cellular phones. The conventional UMTS system also includes network equipment including a Node B, also referred to as a base station, which provides a radio access connection between the UEs and the network, and also including a radio network controller (RNC).

Figure 1B:
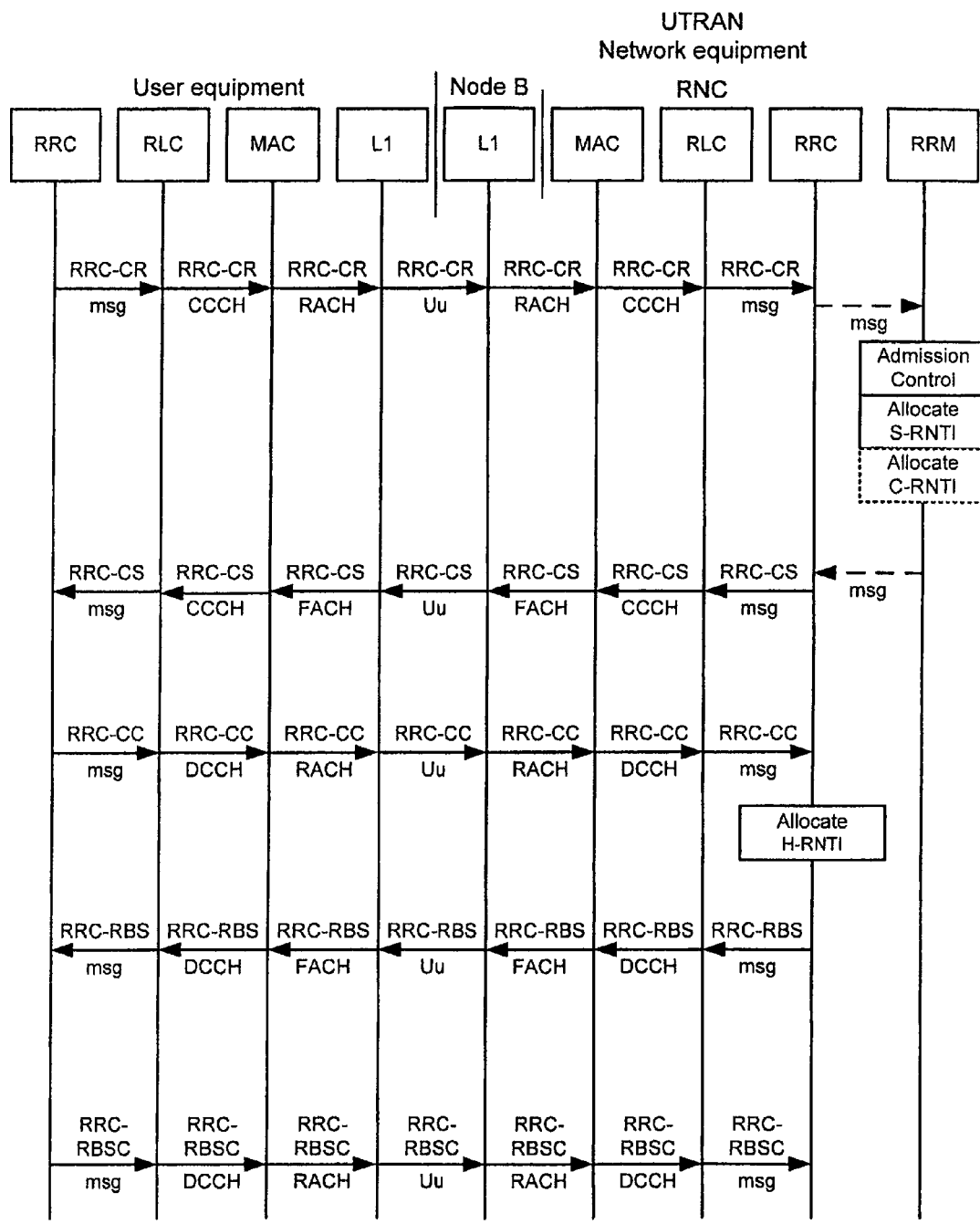

FIGS. 1A and 1B show a conventional sequence of messages for transitioning from a radio resource connection (RRC) idle state to an RRC connected state in a conventional UMTS system. In a conventional UMTS system, a UE in an RRC idle state may initiate an RRC connection through a procedure as indicated in FIGS. 1A and 1B. The UE and network may exchange messages over logical control channels where each logical control channel is mapped to a common transport channel.

FIG. 1A shows the messaging exchanged over the air interface (Uu). The first message shown is the RRC connection request message, which includes the network-known UE identifier, shown as a global UE identifier (ID) and an establishment cause. The network-known UE identifier may be one of the network assigned temporary mobile subscriber identity (TMSI), the UE's international mobile subscriber identity (IMSI), or the UE's international mobile equipment identity (IMEI). The establishment cause indicates the reason for the UE requesting a connection with the network. A UE may request a connection when transmitting a response message to a paging message (paging response), when selecting a suitable cell while in idle mode (cell update), when selecting a suitable URA while in idle mode (URA update), and when receiving MBMS service or an MBMS point-to-point connection (MBMS connection).

Next, the network performs admission control and allocates Radio Network Temporary Identifier (RNTI) values. The network uses an admission control process to determine whether a requested service from the establishment cause can be supported by the network. Factors considered when performing admission control may include mobile access class for determining privileges, the Radio Resource Management status (RRM status) to determine availability of resources, details of the user's subscription, and equipment registers including lists of valid and stolen terminals.

The allocation of the RNTI values involves the network allocating a Serving Radio Network Controller (RNC) RNTI (S-RNTI), which is used by UE to identify itself to the serving RNC. The S-RNTI is also used by the SRNC to address the UE. An S-RNTI value is allocated by the Serving RNC to each UE having an RRC connection and is unique within the Serving RNC. The S-RNTI may be reallocated after the Serving RNC for the RRC connection has changed. The S-RNTI may be concatenated with an SRNC identifier (SRNC ID) received in a broadcast channel to form a unique RNTI (U-RNTI) within UTRAN. Optionally, the network may allocate a Cell Radio Network Temporary Identifier (C-RNTI). The C-RNTI may be allocated and used on common transport channels. The C-RNTI value may be used to identify the UE on a cell basis. In a conventional network, the decision to use the C-RNTI is made by the Controlling Radio Network Controller (CRNC).

After the network equipment performs a successful admission control process and allocation process, the network responds to the RRC connection request message with an RRC connection setup message including the global UE ID, the newly-allocated S-RNTI value, optionally a C-RNTI value, and a radio bearer configuration.

Once the RRC connection setup message is processed by the UE, the UE responds with an RRC connection setup complete message. The RRC connection setup complete message is accompanied by the C-RNTI value in a header field and includes the UE radio access capability. At this point, the UE enters an RRC connected state.

In response to receiving the RRC connection setup complete message, and if the high speed downlink shared channel (HS-DSCH) is to be used for downlink data transfer, the network may allocate an H-RNTI value to the UE within an RRC radio bearer setup message to the UE. The H-RNTI value is used to identify the UE on the high speed downlink shared channel. The RRC radio bearer setup message includes the allocated S-RNTI, the allocated H-RNTI and a shared channel radio bearer configuration. The UE completes the process by responding with an RRC radio bearer setup complete message. At this point, the UE and network have established a layer 2 context for shared channel operations.

FIG. 1B shows elements of the UE and network equipment and the messaging between these elements. The UE includes a layer 3 comprising an RRC layer, a layer 2 comprising a Radio Link Control (RLC) layer and a medium access control (MAC) layer, and a layer 1 comprising a physical layer (L1). The Node B includes a layer 1 physical layer (L1). The RNC includes a layer 2 comprising a MAC layer and an RLC layer, and a layer 3 comprising an RRC layer and an RRM layer. Note additional layer 1 functions also exist in both the Node B and the RNC to provide physical connections between these entities (Iub interface) although these are not shown for diagrammatical clarity. The RRC connection request message is initiated by the RRC layer in the UE. The RRC sends a message to the RLC layer which sends the RRC connection request message a common control channel (CCCH) mapped onto a random access channel (RACH) using an RLC transparent mode (TM). When using a transparent mode (TM) the message sender does not include a message sequence identifier unlike acknowledged mode (AM) and unacknowledged mode (UM), which both include a message sequence identifier that may be used for identifying/reordering out of sequence packets and for identifying missing packets. The acknowledged mode (AM) additionally provides for message retransmission. The CCCH is a common logical control channel between the RLC and MAC layers and the RACH is a common transport channel between the MAC and L1 layers. The RRC connection request message is transmitted over the air interface (Uu) to the network.

Upon receipt of the RRC connection request message, the Node B's layer 1 sends the message on a Random Access Channel (RACH) channel to the MAC layer of the RNC. The RACH channel is a common uplink transport channel used to carry control and data information from a UE over random access physical resources which may be shared by a plurality of UEs and are used for unscheduled data transmission. The MAC layer sends the message to the RLC layer over a CCCH channel. In turn, the RLC layer sends the message to the RRC layer, which sends the message to the RRM layer for admission control, allocation of the S-RNTI value, and optional allocation of the C-RNTI value.

After successful admission control and allocation of the S-RNTI value, the RRM returns the allocated S-RNTI value to the RRC layer, which forms the RRC connection setup message to be sent in an unacknowledged mode (UM). A C-RNTI, which identifies the UE within the cell, is also typically allocated. However, if a dedicated physical channel connection is to be immediately configured, the C-RNTI may be omitted. The RRC sends the RRC connection setup message to the RLC layer. The RLC layer sends the message over a CCCH channel to the MAC layer. CCCH is used because a common RNTI context does not yet exist between the network and the UE. That is, the network knows the RNTI values but the UE does not know the RNTI values at this stage. The MAC layer sends the message over a Forward Access Channel (FACH). The FACH channel is a common downlink transport channel that may be used to carry control and data information to the UE when the network knows the location cell of the UE. The FACH may be shared by a plurality of UEs for unscheduled downlink data transmission. The Node B layer 1 transmits the message to the UE over the air interface (Uu).

Unfortunately, each UE monitoring the FACH channel decodes each and every RRC connection setup message and other messages in order to determine whether the enclosed message was addressed to it. Upon receipt of the RRC connection setup message by the UE, the UE's layer 1 sends the message over a FACH channel to its MAC layer, which sends the message over a CCCH channel to the RLC layer, which in turn sends the message to the RRC layer of the UE. The UE RRC layer may then inspect the global ID field contained within the connection setup message to determine whether or not it matches the UE's own global ID. If not, the message is discarded. If the IDs match, the message is decoded and the UE registers the assignment of the S-RNTI and possibly the C-RNTI values. At this point, the UE now has a dedicated control channel (DCCH) allocated to it.

Next, the UE responds using the RRC connection setup complete message, which is sent using an acknowledge mode (AM) to the network. The RRC layer sends a message to the RLC layer, which uses the DCCH channel to send the RRC connection setup complete message to the MAC layer. The MAC layer sends the message on a RACH (common transport) channel to the physical layer (L1), which transmits the message over the air interface (Uu) to the Node B. Data sent on DCCH on common transport channel resources is accompanied by a header field in which the C-RNTI is contained to distinguish the UE on a cell basis from the plurality of other UEs using the RACH (common transport) channel in that cell. For data sent on dedicated or shared transport channels, no C-RNTI is required in the header since user identification/addressing is accomplished at the physical resource level (the mapping between physical resource and user terminal is known at the physical layer). Once the UE has communicated the RRC connection setup complete message, the UE enters an RRC connected state.

Next, the Node B receives the RRC connection setup complete message over the air interface (Uu). Its layer 1 sends the message to the RNC's MAC layer using a RACH channel. The MAC layer reads the header (containing the C-RNTI) and sends the message to the appropriate RLC entity using the appropriate DCCH channel. The RLC sends the message to the RRC layer.

The network uses another value to identify a UE when the UE communicates over a high speed-downlink shared channel (HS-DSCH). This value is allocated by the RRC layer and is designated the HS-DSCH RNTI (H-RNTI) value. The H-RNTI value is used as a temporary identifier while the UE is has an established connection over the HS-DSCH channel. The network sends the allocated H-RNTI value to the UE within a Radio Bearer Setup message using a DCCH channel between the RLC and MAC layers, and a FACH channel between the MAC layer and the UE's layer 1. The Node B transmits the message over the air interface (Uu) to the UE. The UE's layer 1 sends the message over a FACH channel to its MAC layer, which sends the message to the RLC on a DCCH channel. The RLC sends the message to the RRC layer, which responds with an RRC radio bearer setup complete message sent to the network using an RLC acknowledged mode (AM). The channel path between the UE's RRC layer and the RNC's RRC layer replicates the channel path described above for signaling the RRC connection complete message.

Upon being allocated an H-RNTI, the UE may subsequently utilize the high speed (hs) downlink shared (transport) channel for downlink communication. Resource allocations for this channel are granted by a scheduler located in a MAC-hs entity in Node-B. The MAC-hs entity can address the UE within the cell when making high speed downlink shared channel allocations by using the H-RNTI as a UE identifier.

The MAC-hs entity is not shown in the figure as it does not take part in the connection setup procedure and associated messaging. Messaging used to establish the RRC connection is not conveyed on shared transport channels.

At this point, the UE and the network have established and formed a layer 2 shared channel context and the network has allocated a shared channel identifier to the UE. In forming this layer 2 context, the network allocated the identifier and exchanged three uplink messages and two downlink messages.

According to embodiments of the present invention, a UE derives a temporary identifier (temp ID) to promptly establish a layer 2 context for more immediate communication over shared transport channels. This more immediate layer 2 context can obviate the need for extensive communication over common transport channels and can avoid a need to reserve significant portions of the total available radio resources for common channels. Such an assignment is typically slow to reconfigure and hence is not responsive to rapid changes in traffic loads. If the UE derived temporary identifier is unique in the network during the duration of use, the UE may be uniquely identified on the shared channel and data may be communicated via dynamic assignment of shared channel resources rather than via statically-assigned common resources as is the case in conventional systems. Additionally, the network may update the UE derived temporary identifier during or subsequent to the RRC connection process.

Figure 2:
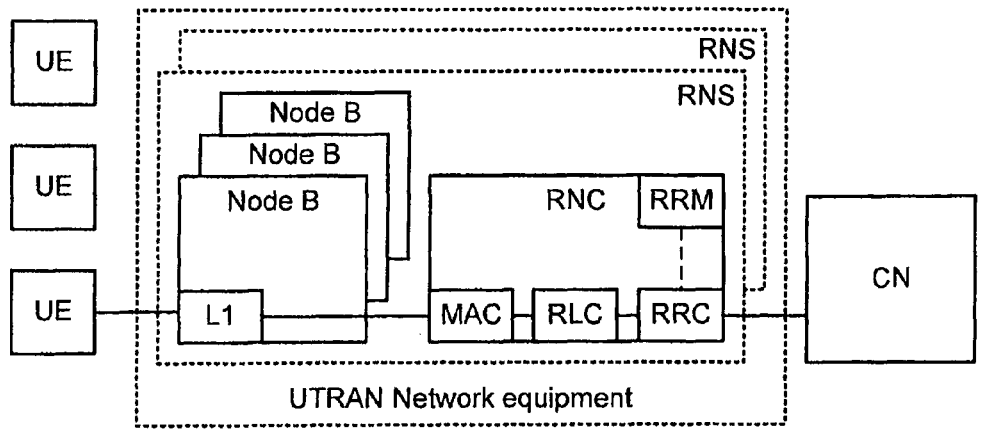
FIGS. 2, 3A and 3B compare a UTRAN network and an evolved UTRAN (E-UTRAN) network operating with user equipment (UEs) and a core network (CN).
Figure 3A:
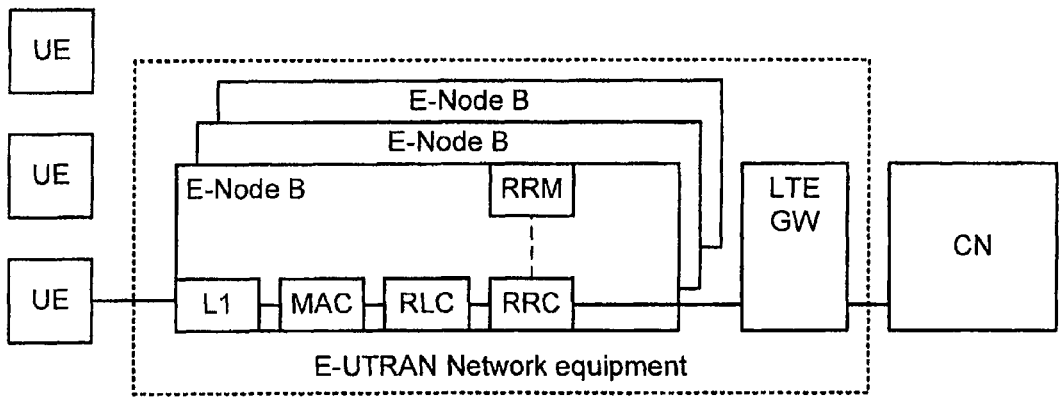
Figure 3B:
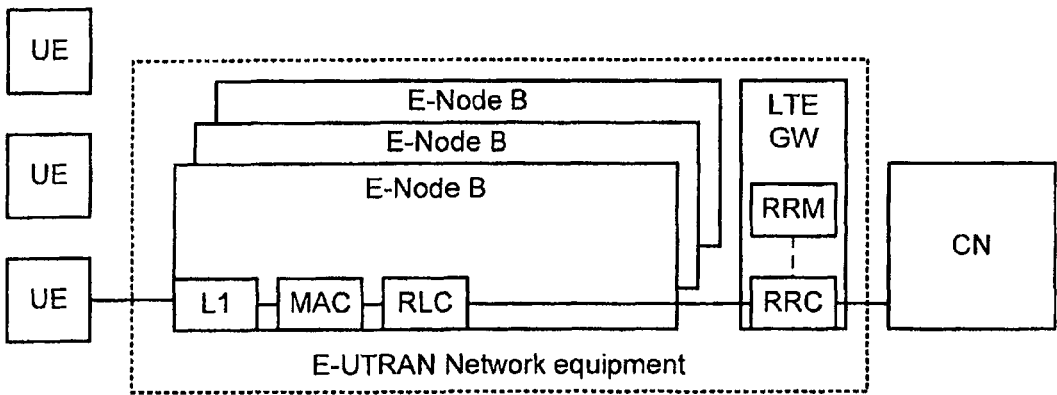

FIGS. 2, 3A and 3B compare a UTRAN network to an evolved UTRAN (E-UTRAN) network operating with user equipment (UEs) and a core network (CN) in accordance with the present invention.

FIG. 2 shows multiple UEs and UTRAN network equipment. The UTRAN network equipment provides a link for the UE to the core network. The UTRAN network equipment, also referred to as a Radio Access Network (RAN), includes one or more Radio Network Subsystem (RNS). Each RNS includes a Radio Network Controller (RNC) and one or more Node Bs. For RRC signaling, the RNC provides RRM, RRC, RLC and MAC signaling layers and the Node B provides layer 1.

FIG. 3A shows an architecture to implement the invention in accordance with some embodiments of the present invention. An evolved UTRAN (E-UTRAN) network provides a long term evolution (LTE) platform to simply the UTRAN architecture and reduce the number of interfaces between components. The "evolved" and "E-" designation may be used to distinguish conventional components or elements that may be similar to the corresponding components or elements of the present invention. The E-UTRAN network provides a link for the UE to communicate with the core network (CN). The E-UTRAN includes an LTE gateway (LTE GW) coupled to one or more evolved Node Bs (E-Node Bs), which perform functions of both the Node B and the RNC of FIG. 2. The LTE gateway provides an interface between the core network and the E-Node Bs. For RRC signaling, the E-Node B provides RRM, RRC, RLC, MAC and L1 signaling layers. Here, the "evolved" and "E-" designations have been omitted from some labeled components within the E-UTRAN network for brevity purposes.

FIG. 3B shows an alternate architecture for an E-UTRAN network. The LTE gateway provides an interface between the core network and the E-Node Bs and also provides RRM and RRC layers for RRC signaling. In this architecture, the E-Node B provides RLC, MAC and L1 signaling layers.

The embodiments of FIGS. 3A and 3B provide a MAC layer and an RLC layer collocated with the layer 1 processing, which aides in reducing signaling latencies. FIG. 3A shows the collection of each of the layers used during the RRC connection establishment procedure, which further assists with reducing signal latencies.

Figure 4:
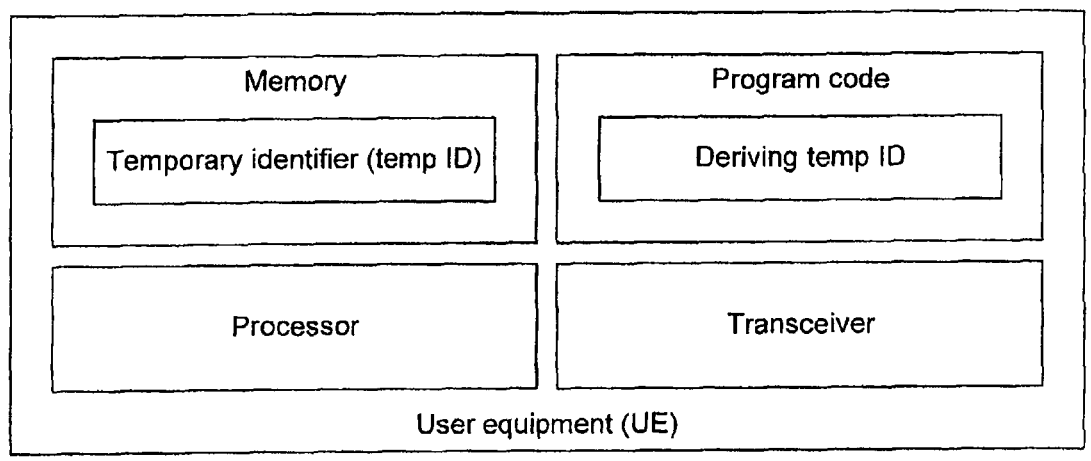
FIG. 4 shows components of user equipment in accordance with the present invention.

FIG. 4 shows components of user equipment in accordance with the present invention. User equipment comprises a memory for holding the UE-derived temporary identifier, a processor, program code executable to derive the UE-derived temporary identifier and store the identifier into the memory, and a transceiver to communicate with the E-UTRAN network equipment. The memory may be volatile memory such as RAM or non-volatile memory such as flash (EEPROM). The memory may be a component of the UE's circuitry or may be on a smart card installed in the UE's housing. The processor may be a reduced instruction set computer (RISC), a general processor, a specialized processor, a gate-logic implemented processor, or the like. The program code may be executable machine code, object code, scripts or other computer interpreted or compiled code. The program code may be compressed or uncompressed and may be encoded or not coded. The transceiver may be a code division multiple access (CDMA) transmitter/receiver pair operating in either a time division duplex (TDD) scheme or frequency division duplex (FDD) scheme.

Figure 5A:
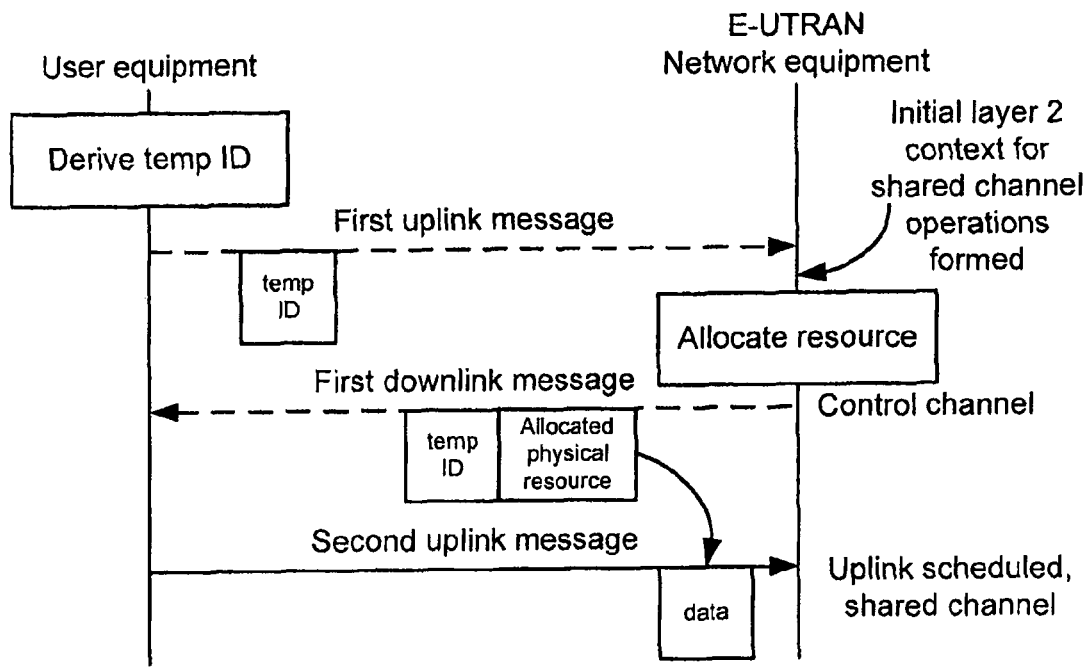
FIGS. 5A and 5B show initial signaling sequences in accordance with the present invention.
Figure 5B:
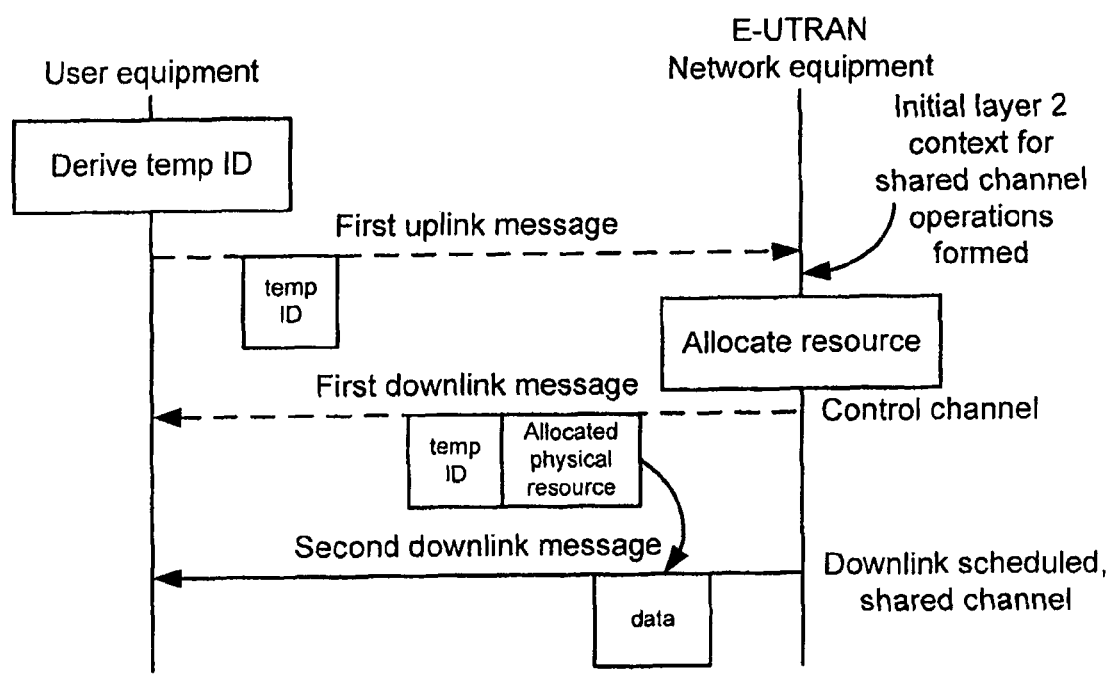

FIGS. 5A and 5B show initial signaling sequences in accordance with the present invention. In each figure, the UE first derives a temporary identifier (temp ID). The process of deriving a temporary identifier may vary among different implementations of the present invention. Derivation of a temporary identifier provides an immediate layer 2 context for layer 2 messaging over shared transport channels which are scheduled by the E-MAC entity in E-Node B. Derivation of a temporary identifier preferably occurs in a manner to minimize the probability to an acceptable level of two UEs deriving the same temporary identifier. If two UEs derive the same temporary identifier within a cell and attempt to use these during an overlapping period of time, additional collision detection and recovery procedures may be implemented.

In some embodiments of the present invention, a UE derives a temporary identifier by forming the temporary identifier from a portion of a network-known UE identifier. The network-known UE identifier may be one of the network assigned temporary mobile subscriber identity (TMSI), the UE's international mobile subscriber identity (IMSI), or the UE's international mobile equipment identity (IMEI). The UE may use a predetermined number of the lower significant bits of the TMSI, IMSI or IMEI. For example, if the TMSI is available, a UE may derive the temp ID by using the lower 16 bits of a 32-bit TMSI. If the TMSI is not available, the UE may use the lower 16 bits of its 32-bit IMSI. If neither the TMSI nor IMSI is available, the UE may use the lower 16 bits of its 32-bit IMEI.

In some embodiments of the present invention, a UE derives a temporary identifier by selecting the temporary identifier from a plurality of temporary identifiers. The plurality of temporary identifiers may comprise a subset of possible values of common bit length. For example, the plurality of temporary identifiers may include $\frac{1}{8}$.sup.th of the possible permutations of 16 bits. A network may re-allocate a temporary identifier by selection of a value from the remaining $\frac{7}{8}$.sup.th possible permutations in order to eliminate a possibility of potential conflict with future UE-derived values. The plurality of temporary identifiers may be in the form of a table stored in RAM or ROM. In some embodiments, the plurality of temporary identifiers is generated by the UE. In some embodiments, the plurality of temporary identifiers is signaled from the network to the UE. In some embodiments, an indication of the plurality of temporary identifiers is broadcast over a broadcast channel (BCH) from the network to the UE. In some embodiments, the plurality of temporary identifiers is saved in non-volatile memory.

In some embodiments the UE-derived temporary identifier may also be a function of time or radio frame number. The function may vary in accordance with a pre-determined pattern or one signaled to the UE for example over a broadcast channel (BCH). Alternatively the variation pattern may contain a random element in its derivation. The use of a time-varying component or a time parameter (such as the system clock, super frame number, radio frame number, sub-frame number, time slot number) by the user equipment when deriving the temporary identifier may advantageously assist in reducing the probability of two or more users selecting the same temporary identifier within a given time-frame.

After deriving the temporary identifier, the UE transmits this UE-derived temporary identifier to the E-UTRAN network in a first uplink message. An initial L2 shared channel context is formed as soon as the network has received the initial temporary identifier; at this stage both the UE and the network know the value of the temporary identifier. However, this connection may be subject to collision, and a more permanent connection (without possibility for collision) may be formed once the network has reassigned a replacement temporary identifier.

Upon receipt of the temp ID, the network allocates a physical resource. An allocated physical resource describes the resources allocated to the UE such as would allow for the UE to correctly encode and transmit or receive and decode the data message. The description may include attributes such as: (1) an explicit or relational time of transmission; (2) description of a physical channel resources, such as codes, frequencies, sub-carriers, time/freq codes, and/or the like; (3) a formatting type of the data on the resources; and/or (4) FEC encoding type, block size, modulation format and/or the like.

This physical resource may be either an uplink resource (as shown in FIG. 5A) or a downlink resource (as shown in FIG. 5B). The network transmits a first downlink message to the UE including the UE-derived temporary identifier as a destination address and also including a description of the allocated physical resource. Next, the UE and network communicate user traffic data or signaling data (data) over the allocated physical resource.

FIG. 5A shows data being communicated on an uplink scheduled, shared resource allocated by the network and described in the first downlink message. For uplink data, the UE can only transmit the data after the UE has received and processed the first downlink message containing the description of the allocated physical resource. The UE may initiate this sequence of deriving a temp ID and acquiring an uplink physical resource when the UE intends to send user traffic data or signaling data to the network.

FIG. 5B shows data being communicated on a downlink scheduled, shared resource allocated by the network and described in the first downlink message. For downlink data, the UE can only receive and process the data after the UE has received and processed the first downlink message containing the description of the allocated physical resource. In some embodiments, the first downlink message is carried and received in a burst also containing the second downlink message. In this case, the UE processes the received burst to obtain the allocated physical resource. If the allocation indicates that the user traffic data or signaling data is contained in the same burst as the first downlink message containing the allocation, the UE may re-process the received burst to obtain the second downlink message.

A conventional system configures both common and shared channels. The segmentation of resources limits the efficient use of the combined resources. For example, if most traffic at a particular time uses common channels, then the shared channels are left idle. Conversely, if most traffic is using the configured shared channels, then the common channels are left under utilized.

In accordance with some embodiments of the present invention, a minimal set of resources may be assigned for unscheduled messages such as the first uplink message of FIGS. 5A and 5B. Uplink messages on this channel may be limited to short messages containing only the temp ID or alternatively containing the temp ID and an indication of what type of resource is being requested. Unscheduled downlink channels (e.g., FACH) may be removed from the configured channels since each UE initiates contact with the network using a layer 2 addressable temp ID. The remainder of the resources may be dynamically allocated between control channel message (e.g., the first downlink message) and user traffic data or signaling data (i.e., second downlink or uplink message). Such an allocation of resources provides a higher bandwidth system due to the more efficient use of resources.

Figure 6A:
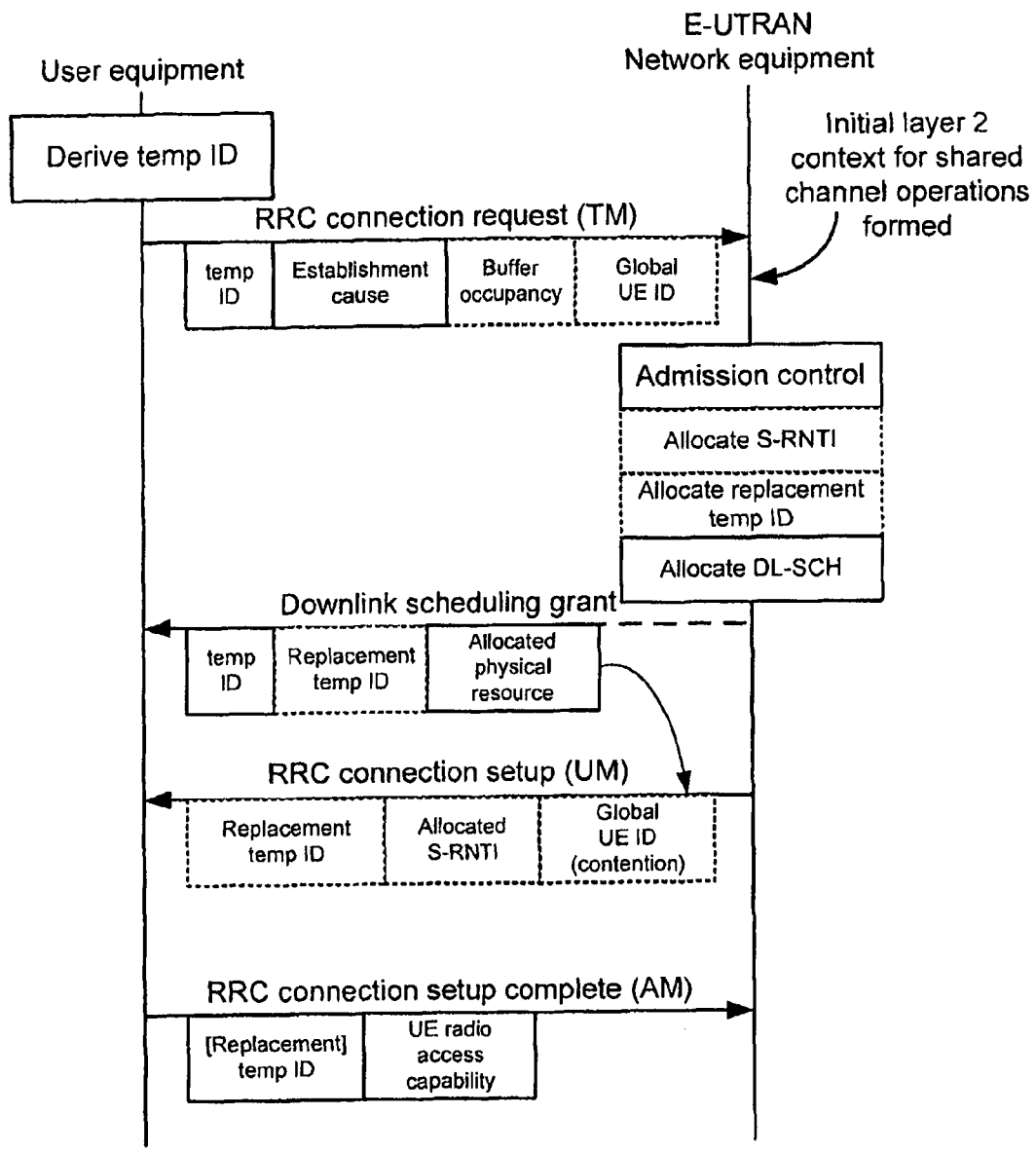
FIGS. 6A and 6B show detailed signaling sequences using a scheduled downlink in accordance with the present invention.
Figure 6B:
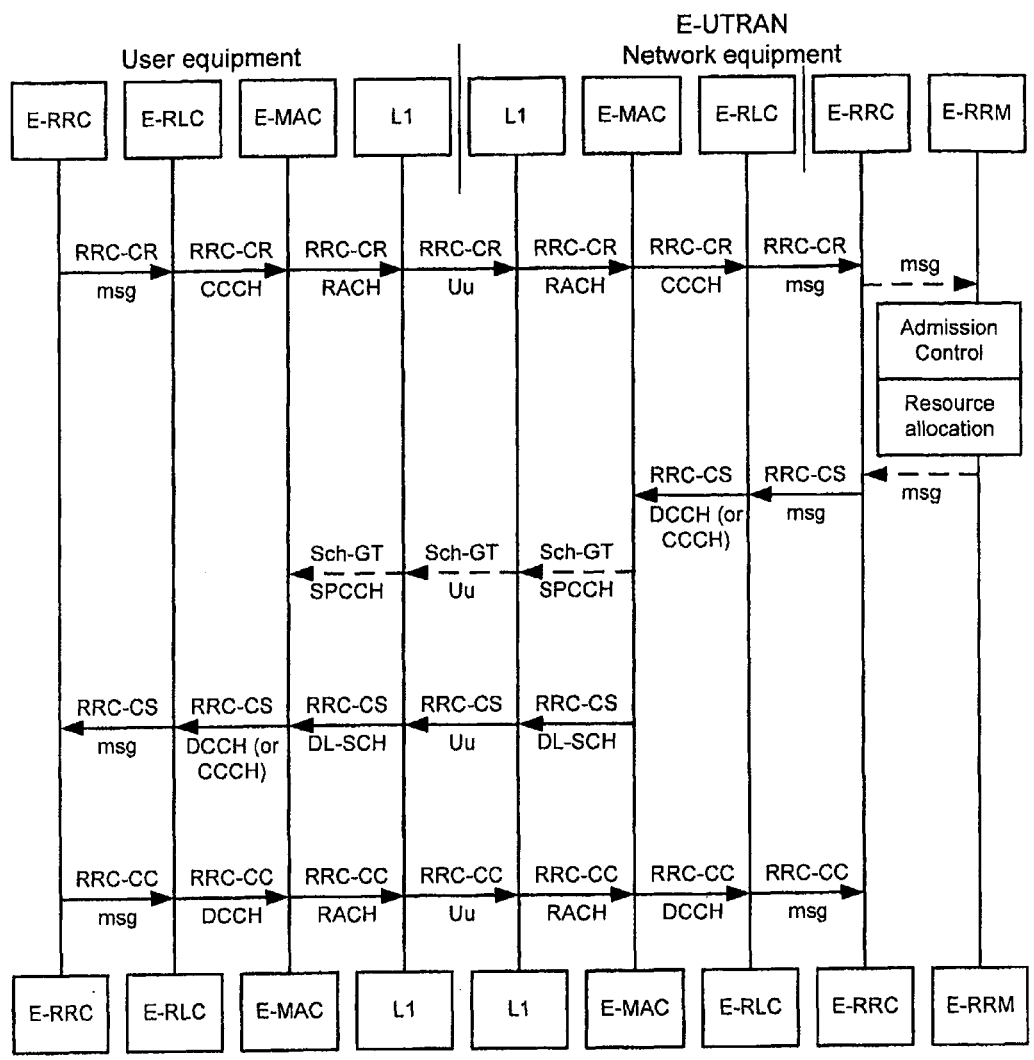
Figure 7A:
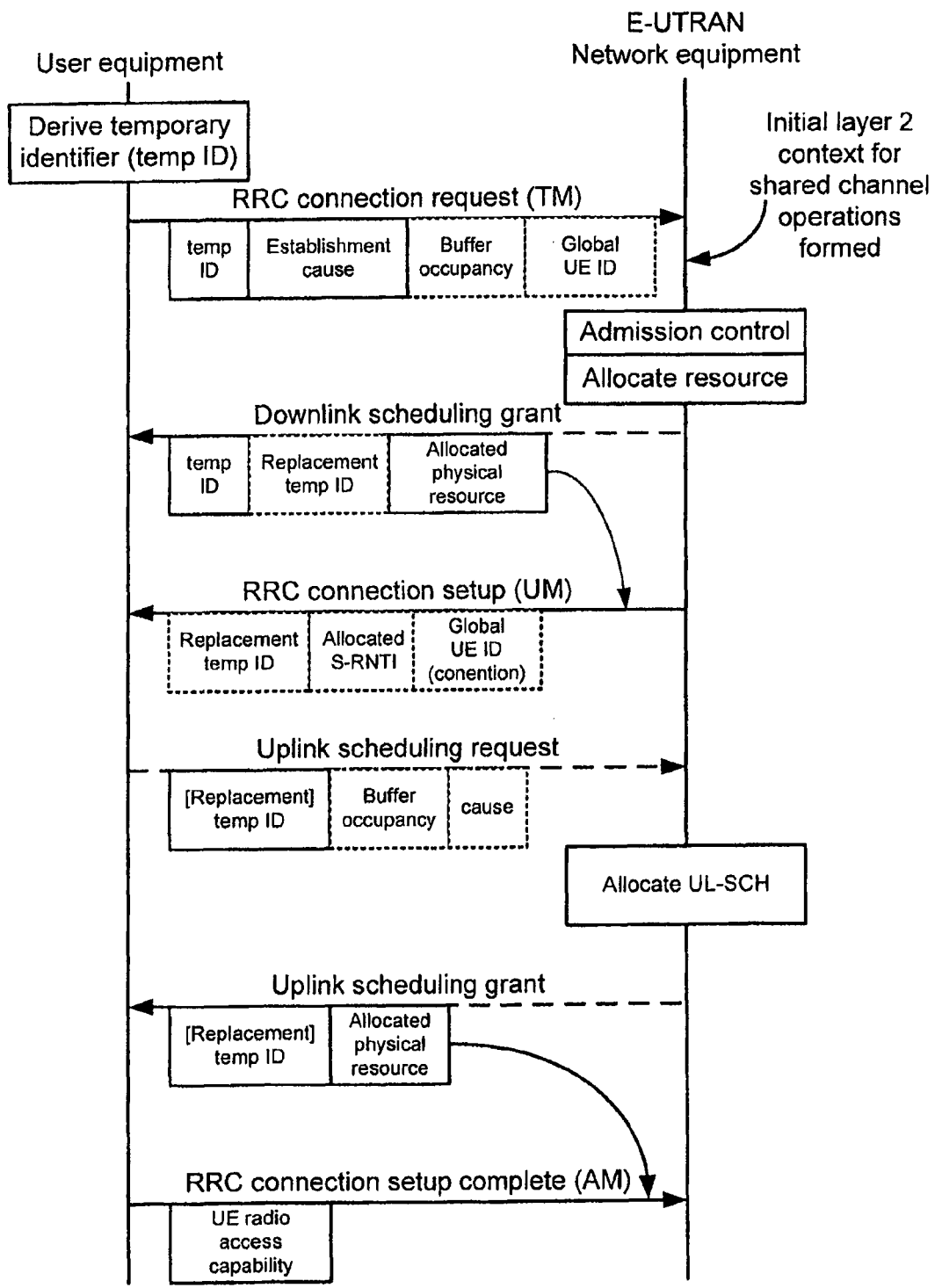
FIGS. 7A and 7B show detailed signaling sequences using a scheduled downlink and both non-scheduled and scheduled uplink in accordance with the present invention.
Figure 7B:
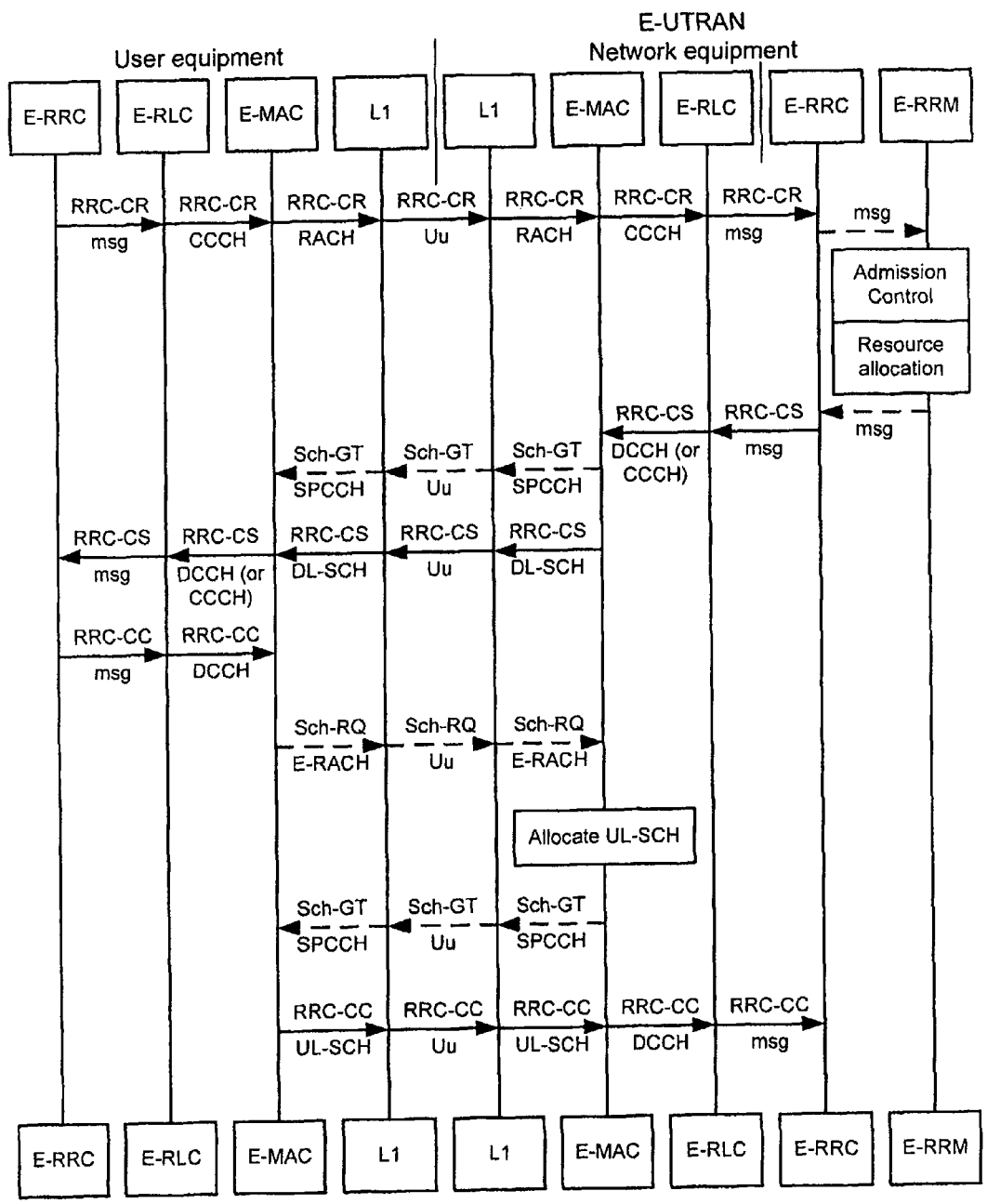
Figure 8A:
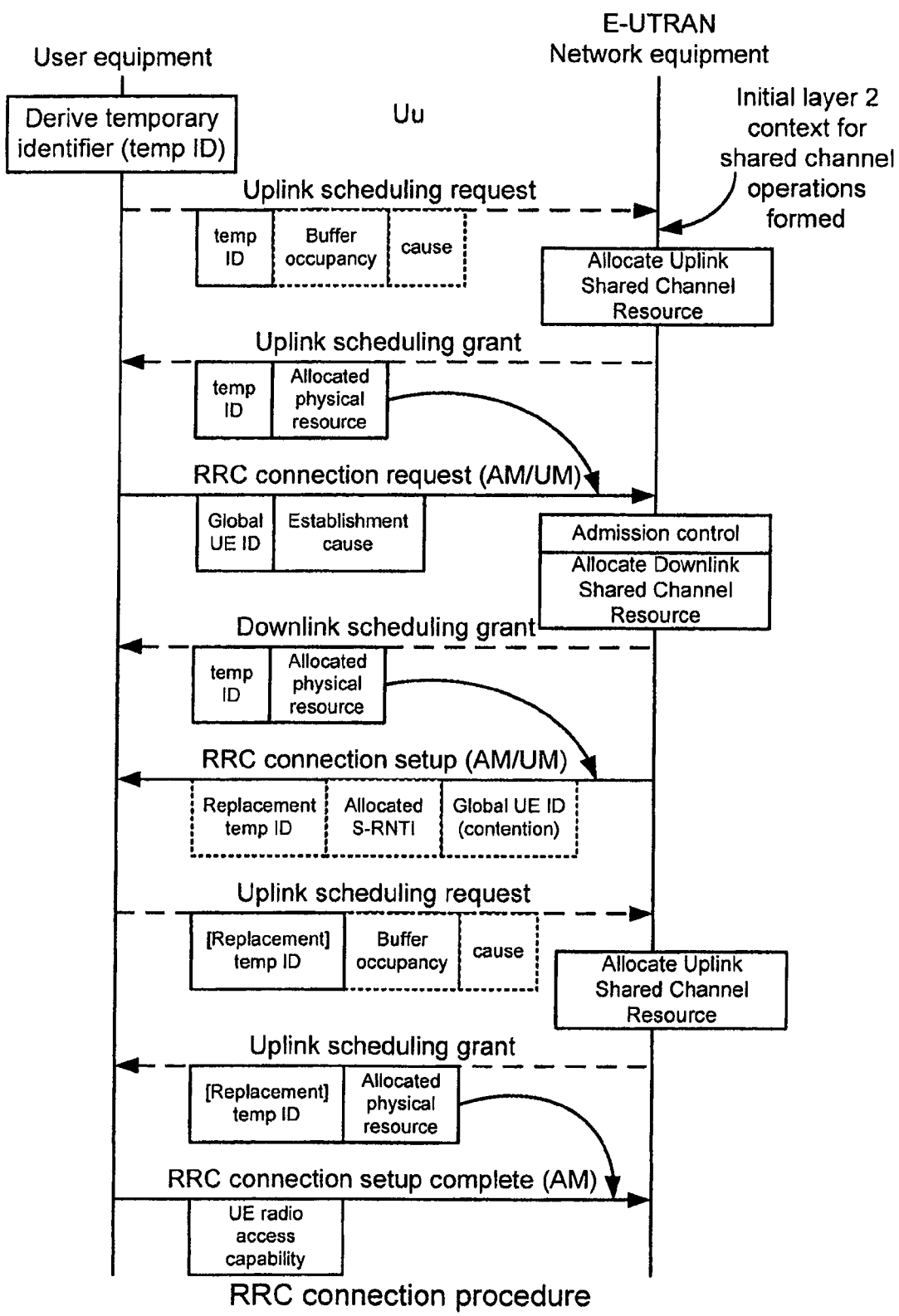
FIGS. 8A and 8B show detailed signaling sequences using a scheduled downlink and a scheduled uplink in accordance with the present invention.
Figure 8B:
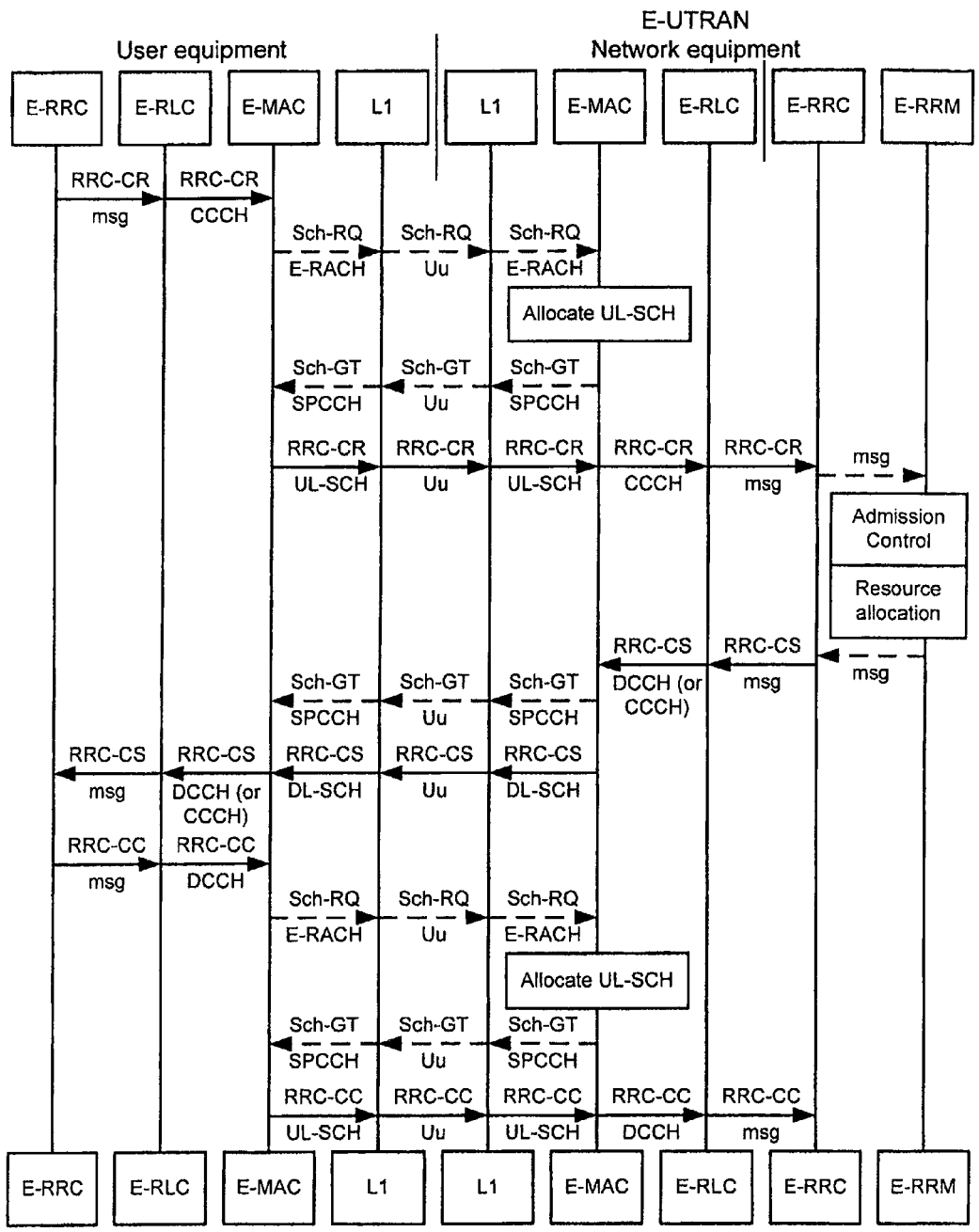

As shown in FIGS. 6A and 6B, some embodiments of the present invention utilize a random access channel (RACH) for a first uplink message, a scheduled channel for downlink messages, and a common channel for subsequent uplink messages. As shown in FIGS. 7A and 7B, some embodiments of the present invention utilize a random access channel (RACH) for a first uplink message and scheduled channels for subsequent downlink and uplink messages. As shown in FIGS. 8A and 8B, some embodiments of the present invention utilize a random access channel (RACH) for an abbreviated initial uplink message and scheduled channels for subsequent downlink and uplink messages.

FIGS. 6A and 6B show detailed signaling sequences using a scheduled downlink in accordance with the present invention. A UE derives a temporary identifier and sends the temporary identifier in a first uplink message to the network. In addition to the temp ID, the first uplink message contains an establishment cause parameter and two optional parameters: buffer occupancy and a global UE ID. The establishment cause and the global UE ID may be the same or similar to the corresponding parameters described above with reference to FIG. 1A.

The buffer occupancy may be used as an indication of the current pending data volume for transmission in the UE's transmission buffer and may be used by a scheduler at Node B to determine the extent of resources to grant for uplink transmission. The buffer occupancy could be a single bit, a range of quantized values, an absolute value in bytes, or a list of values, for example, one for each of a number of transmission flows, types or priority streams.

The UE may transmit the RRC connection request message using transparent mode (TM). Upon receipt of the RRC connection request message by the network equipment, the network performs admission control (described above with reference to FIG. 1A) and allocates a physical resource: either an uplink shared channel (UL-SCH) or a downlink shared channel (DL-SCH) as indicated by the establishment cause parameter. Optionally, the network may also allocate an S-RNTI and a replacement temp ID.

The network transmits a first downlink message containing a downlink scheduling grant indication including the temp ID to address the particular UE and a description of the allocated physical resource. The first downlink message may be transmitted on a shared physical control channel (SPCCH) monitored my UEs expecting or waiting for possible scheduling messages. A network may also send a replacement temporary identifier. The network may select the replacement temporary identifier from a list or table of unique identifiers not selectable by UEs. Such replacement temporary identifier insures that a message containing a UE-derived temporary identifier from a first UE will not collide with a message containing the same temporary identifier derived by a second UE. In effect, the UE-derived temporary identifier provides a limited duration hopefully-unique identifier that may be replaced by a more certain network selected unique identifier. The replacement temporary identifier may be sent in an RRC connection setup message, or may also be contained within the SPCCH grant message.

Upon receipt of the downlink scheduling grant message, UEs decode the short scheduling message and inspect the temp ID. Only the UE address by the temp ID needs to decode the longer message sent or to be sent on a downlink shared channel (DL-SCH). Other UEs not addressed by the scheduling grant message need not spend CPU cycles or battery resources to decode an RRC connection setup or other long messages to determine if the message is directed to it.

The UE identified by the temp ID receives and decodes the message transmitted in the allocated physical resource described in the downlink scheduling grant message. This second downlink message to the UE may contain a RRC connection setup message transmitted by the network using unacknowledged mode (UM). The RRC connection setup message may optionally contain a replacement temp ID, an allocated S-RNTI value, and/or a global UE ID. If the UE receives a replacement temp ID, it uses this replacement temp ID as its temporary identifier when signaling messages with the network. Additionally, the global UE ID may be included in this first downlink message if received by the network from the RRC connection request message and if a conflict between overlapping temp IDs is detected by the network. In some embodiments, the global UE ID is incorporated explicitly in the message. In other embodiments, the global UE ID is used for encoding the downlink message (e.g., CRC).

The contention resolution process of handling conflicts is further described below with reference to FIGS. 9 and 10.

Furthermore, in some embodiments, a radio bearer configuration may be transmitted to multiple UEs using a broadcast channel (BCH).

Next, the UE responds to receiving and processing the RRC connection setup message by preparing and transmitting a RRC connection setup complete message using acknowledge mode (AM). If a replacement temp ID was provided by the network, the UE uses this new value as its temporary identifier. The RRC connection setup complete message may also contain UE radio access capability parameters indicating various capabilities of the UE.

In accordance with the present invention, information contained within the conventional RRC radio bearer setup message (FIG. 1A) may be broadcast on a BCH rather than signaled individually to each UE since the information describing a shared channel may be used by multiple UEs in a cell.

FIG. 6B shows elements of the UE and network equipment and the messaging between these elements. The UE includes a layer 3 comprising an evolved RRC (E-RRC) layer, a layer 2 comprising an evolved Radio Link Control (E-RLC) layer and an evolved MAC (E-MAC) layer, and a layer 1 comprising a physical layer (L1). The E-UTRAN network includes a layer 1 physical layer (L1), a layer 2 comprising an evolved MAC (E-MAC) layer and an evolved RLC (E-RLC) layer, and a layer 3 comprising an evolved RRC (E-RRC) layer and an evolved RRM (E-RRM) layer.

The RRC connection request message is initiated by the E-RRC layer in the UE. The E-RRC sends a message to the E-RLC layer which sends the RRC connection request message a common control channel (CCCH) mapped onto a random access channel (RACH) using a transparent mode (TM). The CCCH is a logical control channel between the E-RLC and E-MAC layers and the RACH is a common transport channel between the E-MAC and L1 layers. The RRC connection request message is transmitted over the air interface (Uu) to the network.

Upon receipt of the RRC connection request message, the network equipment's layer 1 sends the message on a Random Access Channel (RACH) channel to the MAC layer. The MAC layer sends the message to the E-RLC layer over a CCCH channel. In turn, the E-RLC layer sends the message to the E-RRC layer, which sends the message to the E-RRM layer for admission control and allocation of the replacement temporary identifier and optionally the replacement S-RNTI value.

After admission control and optional replacement of the temporary ID and optional allocation of the S-RNTI value, the E-RRM returns the allocated values to the E-RRC layer, which forms the RRC connection setup message to be sent in an unacknowledged mode (UM). The E-RLC sends the RRC connection setup message to the E-RLC layer. The E-RLC layer sends the message over a DCCH or a CCCH channel to the E-MAC layer.

Instead of simply forwarding the RRC connection setup message, the E-MAC layer sends a scheduling grant message over a shared physical control channel (SPCCH) to layer 1 for transmission to the UE. The UE's layer 1 receives the scheduling grant, which indicates the physical resource that will carry the RRC connection setup message. The E-MAC layer also transmits, either concurrently or subsequently, the RRC connection setup message to layer 1 on the allocated physical resource on the downlink shared channel (DL-SCH). Layer 1 transmits the RRC connection setup message over the air interface (Uu) to the UE. Fortunately, each UE monitoring the air interface decodes only the short scheduling messages in order to determine whether the enclosed message was addressed to it rather than the longer RRC connection setup message and other messages.

Upon receipt of the RRC connection setup message by the UE, the UE's layer 1 sends the message over a DL-SCH channel to its E-MAC layer, which sends the message over a DCCH or CCCH channel to the E-RLC layer, which in turn sends the message to the E-RRC layer of the UE.

Next, the UE responds using the RRC connection setup complete message, which is sent using an acknowledge mode (AM) to the network. The E-RRC layer sends a message to the E-RLC layer, which uses the DCCH channel to send the RRC connection setup complete message to the E-MAC layer. The E-MAC layer sends the message on a RACH channel to the physical layer (L1), which transmits the message over the air interface (Uu) to the network. Once the UE has communicated the RRC connection setup complete message, the UE enters an RRC connected state.

Next, the network receives the RRC connection setup complete message over the air interface (Uu). Its layer 1 sends the message to the E-MAC layer using a RACH channel. The E-MAC layer sends the message to the E-RLC using a DCCH channel. The E-RLC sends the message to the E-RRC layer.

FIGS. 7A and 7B show detailed signaling sequences using a scheduled downlink and both non-scheduled and scheduled uplink in accordance with the present invention. The scheduling and exchange of the RRC connection request message and the RRC connection setup message, as well as admission control and allocation of resources are as described above with reference to FIGS. 6A and 6B. FIGS. 7A and 7B depart from the previous embodiment by sending subsequent uplink messages on shared resources.

Specifically, when the UE's E-MAC layer receives the RRC connection setup complete message from its E-RLC layer, the UE's E-MAC layer first sends a scheduling request message on a RACH channel or an evolved RACH (E-RACH) channel. The short scheduling request message requests allocation of an uplink physical resource from the network. The scheduling request message is transmitted over the air interface (Uu) to the network. Upon receipt of the scheduling request message by the network's layer 1, the scheduling request message is forwarded on the RACH channel to the network's E-MAC layer. The E-MAC layer allocates an uplink shared channel (UL-SCH) to the UE and describes the uplink allocation in a scheduling grant message sent on a shared physical control channel (SPCCH) from the E-MAC layer to layer 1, then over the air interface (Uu) to the UE's layer 1, which forwards the scheduling grant message on an SPCCH channel to the E-MAC layer. The E-MAC layer forwards the RRC connection setup complete message to layer 1 on the allocated UL-SCH resource for transmission to the network.

By using a shared, scheduled uplink and/or downlink scheme in accordance with some embodiments of the present invention, one or more advantages may be realized. For example, in some embodiments, shorter messages on the initial uplink resource may reduce the number collisions at the physical layer over the air interface. In some embodiments, logical collisions (occurring due to a common temporary identifier independently derived by two UEs during an overlapping time period) may be overcome by collision recovery procedures at the UE and/or by collision recovery procedures in the network. In some embodiments, resources that would otherwise be dedicated to RACH and/or FACH common channels may be either reduced or possibly eliminated; thus these resources are available for allocation to other channel traffic types. Thus a more efficient usage of radio resources may be realized when compared to the case in which multiple traffic types are not allowed to share the same shared channel resources and instead need to be assigned separate resources. This is because, by multiplexing all traffic types onto only shared channels, the scheduler can dynamically adapt the resources assigned to the varying instantaneous loads presented by each traffic type. In contrast, if separate radio resources are statically assigned to each traffic type then variations in the traffic loads offered by each traffic type cannot be accommodated without reconfiguring the respective portions of the total radio resource space assigned firstly to common and secondly to shared channels. In some embodiments, signaling latency and response time as viewed by the UE may be reduced. In some embodiments, the use of scheduled channels means that a UE decodes short scheduling messages and no longer needs to monitor and decode each common channel message address to other UEs, which may lead to more efficient use of the UE's battery life. Furthermore, in some embodiments, the connection setup signaling exchange over a high speed channel may occur faster than over a conventional common channel.

FIGS. 8A and 8B show detailed signaling sequences using a scheduled downlink and a scheduled uplink in accordance with the present invention. In the embodiment shown, the initial uplink communication is scheduled as well as subsequent communications. Rather than transmitting an initial message containing the RRC connection request, the UE first sends a short scheduling request message to request the network allocate an uplink physical resource. The UE derives and includes a temporary identifier in the short uplink message. The message may optionally include a buffer occupancy parameter (described above) and a cause parameter. The cause parameter may indicate the reason for the request (e.g., uplink physical resource requested). The network allocates an uplink shared channel (UL-SCH) and transmits a scheduling grant on a shared physical control channel (SPCCH) including the UE-derived temporary identity and a description of the UL-SCH. The E-MAC layer of the UE receives the uplink scheduling grant message on the SPCCH channel and responds by sending the RRC connection request on the allocated UL-SCH physical channel. The RRC connection request message is received by the network which performs admission control and additional resource allocation as describe above with reference to FIGS. 7A and 7B. Furthermore, FIG. 8A shows some embodiments may use acknowledged mode (AM) while other embodiments may use unacknowledged mode (UM) when communicating either or both of the RRC connection request and RRC connection setup messages.

Figure 9:
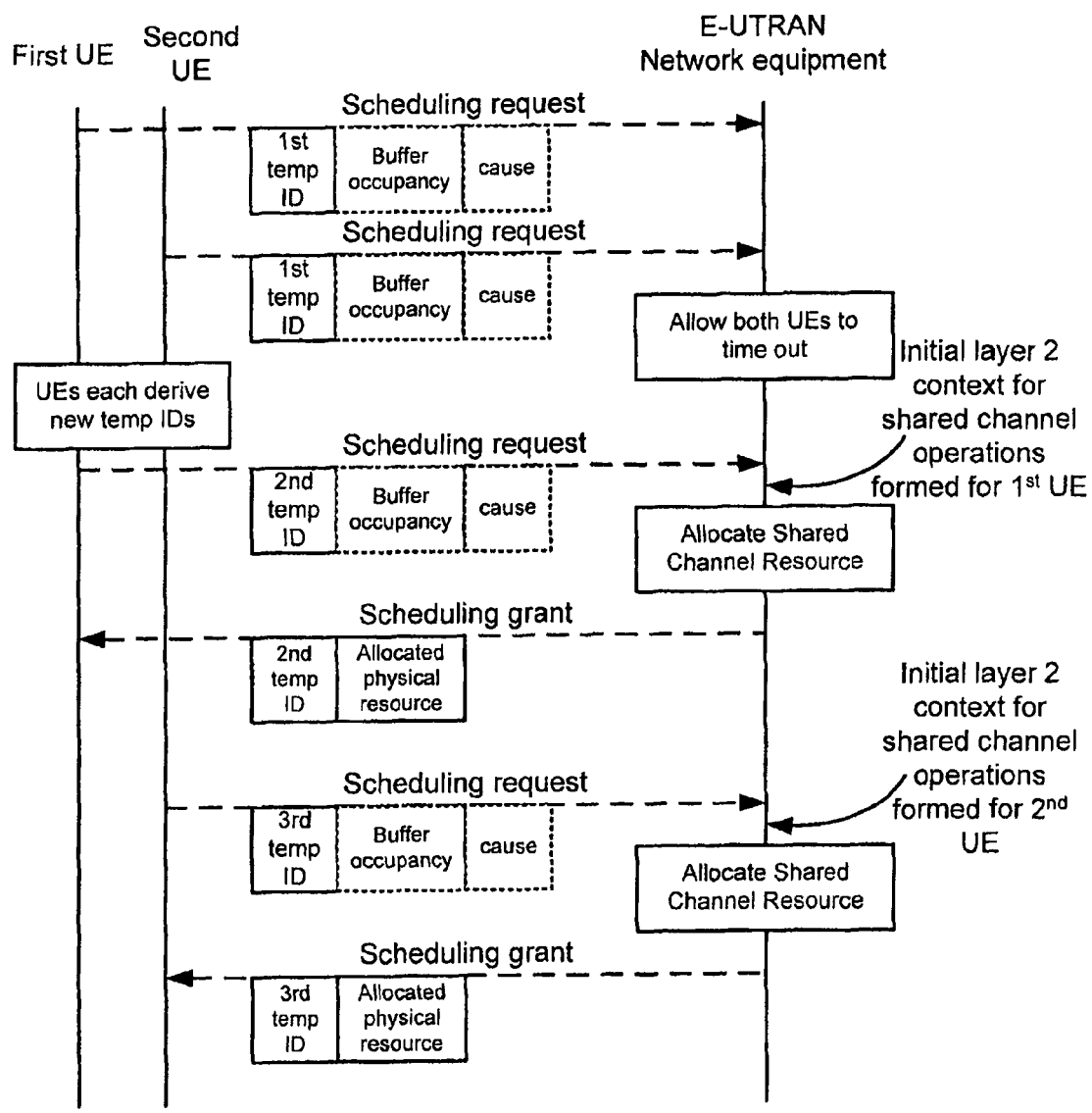
FIGS. 9 and 10 illustrate processes of contention resolution in accordance with the present invention.
Figure 10:
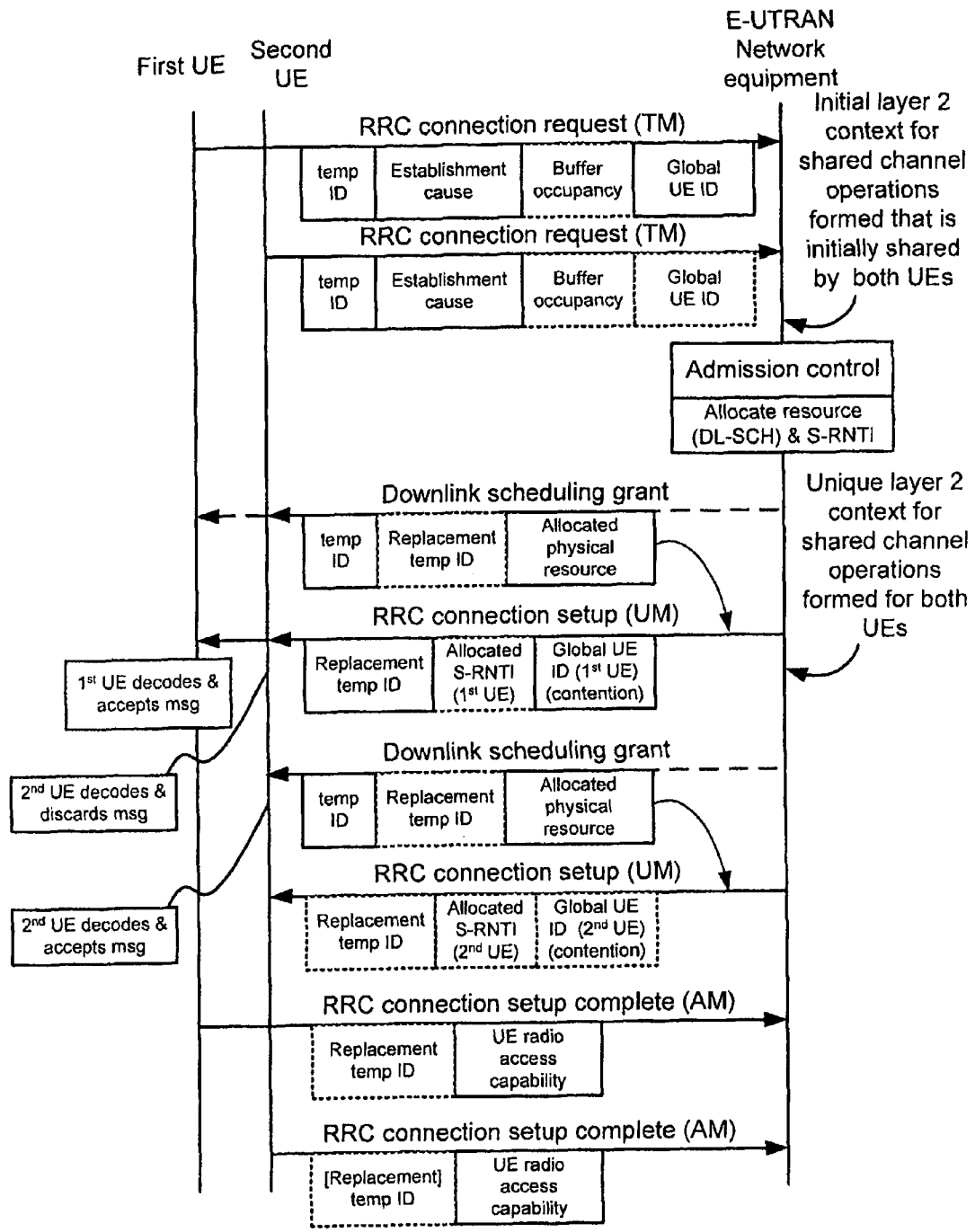

FIGS. 9 and 10 illustrate processes of contention resolution in accordance with the present invention. This contention scenario occurs when two UEs derive and are using a common temporary identifier. Each UE transmits an RRC connection request message as described with reference to FIG. 5A, 5B, 6A-B, 7A-B or 8A-B. Derivation of a temporary identifier preferably occurs in a manner to minimize the probability to an acceptable level of two UEs deriving the same temporary identifier. However, in some embodiments two UEs might derive the same temporary identifier within a cell. Therefore, additional collision detection and recovery procedures may be implemented.

FIG. 9 illustrates a remedy primarily instigated by the UEs. Two UEs each transmit an uplink message to the network using an identical temporary identifier ($1^{st}$ temp ID). The uplink message may be a message transmitted on a RACH channel or an E-RACH. The message may be a scheduling request message (as shown) or some other message. The network may detect the duplicate identical temporary identifier in the two uplink messages. The network may elect to perform no following processing and will allow each UE to time out. After not receiving the expected downlink response, each UE discards the initially derived temporary identifier and derives another temporary identifier ($2^{nd}$ temp ID and $3^{rd}$ temp ID, respectively). Each UE then retransmits the original uplink message using the newly derived temporary identifier. Upon receipt of the newer temporary identifier, an initial layer 2 context is established between the respective UE and the network for shared channel operations. The network then responds to each UE having a unique temp ID as described above.

FIG. 10 illustrates a remedy primarily instigated by the network. Again, two UEs each transmit an uplink message to the network using an identical temporary identifier (temp ID). The uplink message may be a message transmitted on a RACH channel or an E-RACH. The message may be an RRC connection request message (as shown) or some other message. The network may detect an identical temporary identifier in the two uplink messages. In this case, two UEs have derived the same temp ID and may each may expect downlink signaling including this temp ID to be address to it. In such a case, the network may determine that a conflict or collision has occurred. However, if one or both of the uplink messages includes a global UE ID, the UEs may be distinguished from one another. At this point, an initial layer 2 context is established between the respective UE and the network for shared channel operations.

The network may transmit, on a control channel, a scheduling grant message allocated a downlink resource. The network may also transmit, on a traffic channel described in the scheduling grant message, a message incorporating a global UE ID. For example, the network may transmit an RRC connection setup complete message incorporating addressed to the UEs using the conflicting UE-derived temporary identification. In some embodiments, the network explicitly incorporates the global UE ID in the downlink message by including the global UE ID as a parameter. Alternatively, the network may incorporate the global UE ID by using the global UE ID to encode the downlink message. For example, the incorporating may comprise computing a cyclic redundancy check (CRC) value using the network-known UE identifier. When decoding the downlink message, each UE may use its global UE ID to determine whether the global UE ID was incorporated explicitly as a parameter or alternatively to decode the message to determine whether the previously-transmitted global UE ID was used by the network to encode the message. Additionally, the network may respond by allocating a replacement temp ID to the UE that transmitted its global UE ID. Once one of the UEs receives a replacement temp ID, a unique layer 2 context is formed for both UEs for shared channel operation. The first UE will receive and properly decode the RRC connection setup message, which is encoded with its UE. The second UE will attempt to decode the RRC connection setup message but will fail because the message is encoded with an unknown global UE ID causing the second UE to discard the message and return to the downlink scheduling channel (SPCCH). The second UE will then receive a second downlink scheduling grant message sent by the network. The second UE will then properly receive and decode the RRC connection setup message addressed to it. Both UEs may complete the process by responding with an RRC connection setup complete message.

Figure 11:
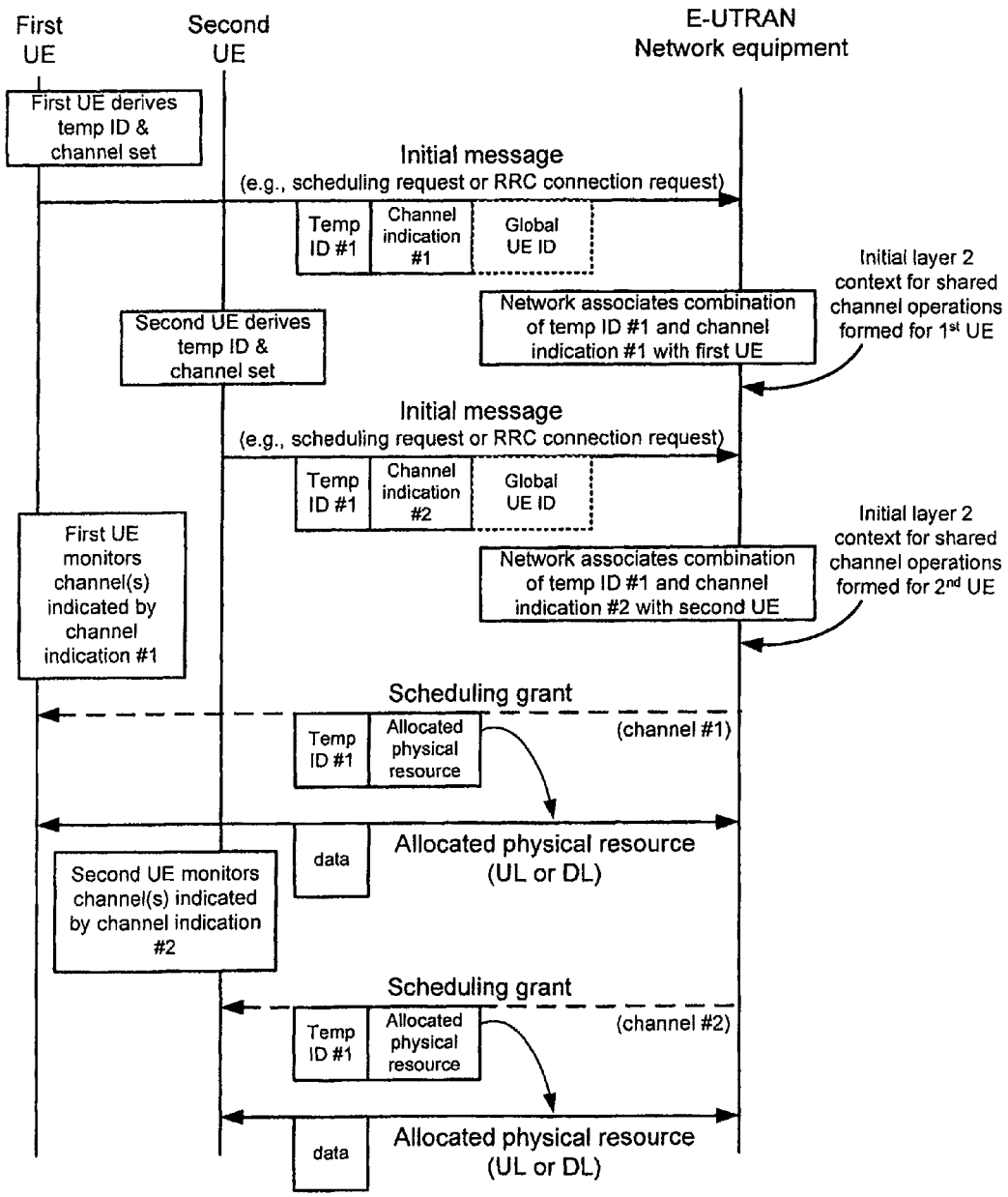
FIGS. 11 and 12 illustrate processes of contention avoidance and resolution using multiple scheduling grant channels in accordance with the present invention.
Figure 12:
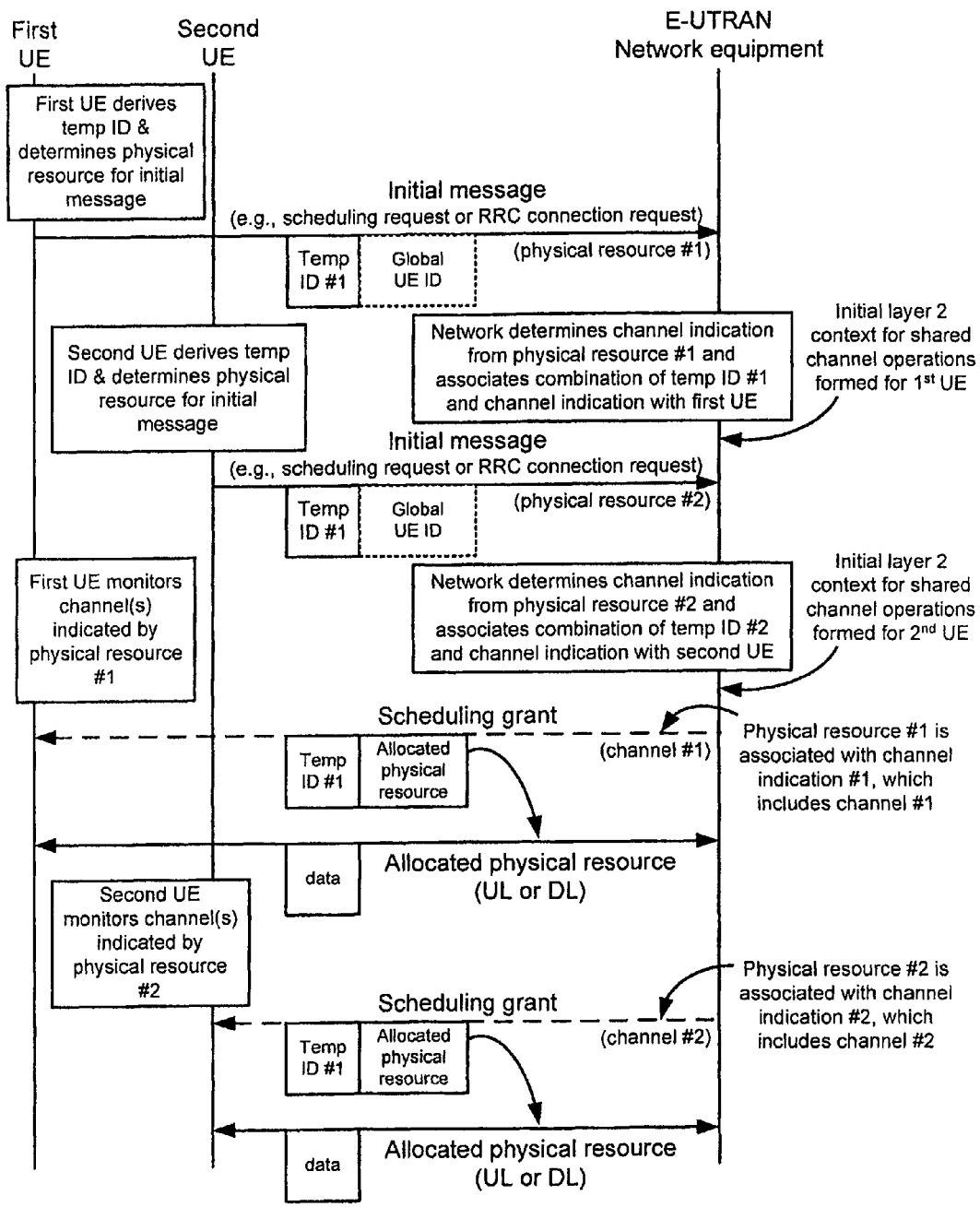

FIGS. 11 and 12 illustrate processes of contention avoidance and resolution using multiple scheduling grant channels in accordance with the present invention. Some systems may configure multiple channels (e.g., multiple SPCCH channels) for communicating scheduling grant messages from the network to UEs. These channels may be pre-configured, may be defined by a standard, or may be sent to the UE (for example, sent via a broadcast channel or other system control signaling).

A UE may derive or select a subset (i.e., a single channel or multiple channels) from the configured multiple channels for later monitoring of scheduling grant messages. The derived subset of channels that a UE will monitor may be referred to as a channel set. Using an uplink message, a UE may communicate the channel set either explicitly using a parameter or implicitly by use of a particular physical resource. By communicating a channel set or an indication of a channel set, a network may differentiate UEs that happened to have derived the same temporary identifier but have fortunately derived different channel sets. FIG. 11 illustrates an example of a UE explicitly communicating a channel set to a network by transmitting an initial message containing an indication of the channel set. FIG. 12 illustrates an example of a UE implicitly communicating a channel set by way of using a particular uplink physical resource to transmit an initial message to the network.

In FIG. 11, prior to establishing a connection with the network equipment, a first UE derives a temporary identifier (temp ID) as discussed above. The first UE also derives a channel set. That is, the UE selects a scheduling grant channel (SPCCH) that it will monitor for future scheduling grant messages. Alternatively, a UE may select more than one of the configured scheduling grant channels (SPCCHs), this being termed a channel set.

To derive a channel set containing a single channel or multiple channels that the UE monitors for scheduling grant messages, a UE may select the channel set based on one or a combination of the following parameters: (1) the UE's global UE identifier such as its TMSI, IMSI or IMEI; (2) the derived temporary identifier; and (3) one or more characteristics of the physical resource the UE will use to transmit the initial message. The characteristics of the physical resource include a time parameter (such as a system clock, super frame number, radio frame number, sub-frame number, time slot number), a frequency parameter (such as a frequency band, channel number or sub-carrier number) and a code (such as a midamble code, a scrambling code, a channelization code, a time-frequency code or an orthogonal code).

The example shows a first UE deriving a temporary identifier (temp ID) in conjunction with a channel set. The channel set may be a single SPCCH channel number or a set of multiple SPCCH channel numbers. The channel set may be represented by a channel indication (e.g., channel indication #1). For example, the channel set may be communicated by transmitting a channel indication value that represents an index to a table known to both the UE and the network. The table entries may represent a single channel number or may represent multiple channels from the set of possible channels.

Next, the first UE sends an initial message containing both the selected temporary identifier and a channel indication to communicate to the network which one or more channels the network should use to send scheduling grant messages. For example, the initial message may be a scheduling request for scheduled uplink radio resources or an RRC connection request message sent as a first message during a connection setup process on non-scheduled uplink radio resources. In some embodiments, the UE may also send a global UE identifier (such as a TMSI, IMSI or IMEI) for use in conflict detection and resolution as discussed above with reference to FIG. 10. Upon receipt of the initial message, the network may associate the temporary identifier and the channel set pair with a particular UE (e.g., the first UE).

The example further shows a second UE initiating a connection simultaneously or a short time later. The second UE similarly derives a temporary identifier and a channel set represented by a channel indication (e.g., channel indication #2). For illustrative purposes, the example shows that the second UE derived the same temporary identifier (temp ID #1) as did the first UE. However, the second UE happens to have selected a different channel set. The second UE then sends the temporary identifier and the channel indication to the network in an initial message. Upon receipt of the initial message, the network may associate the received temporary identifier and channel set pair with the second UE.

At this point, both UE's are associated with the same temporary ID, however, due to their selection of different and non-overlapping SPCCH channel sets as indicated in their channel indication parameters, unintended cross communication may be avoided. The first and second UE will monitor different SPCCH channels, therefore a common derived temporary identifier may be used by the network to address both UEs. The network will address both UEs with the same temporary identifier but will send a scheduling message to the first UE on one of the channels indicated by channel indication #1 and will send another scheduling message to the second UE on one of the channels indicated by channel indication #2. Hence, each UE will not process a scheduling grant message addressed to the other UE.

Thus, a unique shared channel communication context has been formed by the system for each UE by virtue of the two UEs selecting different SPCCH channel sets. Communicating a channel indication may not completely remove the possibility for contention because two UEs may still derive the same temporary identifier and the same channel set. In this event, the contention resolution procedures discussed above with reference to FIGS. 9 and 10 may be applied within the context of the present invention.

As further shown in FIG. 11, the network may communicate data with the first UE over a scheduled shared channel using the steps of: (1) receiving a temporary identifier (temp ID #I) and a channel indication (channel indication #1); (2) allocating downlink or uplink shared channel resources; (3) determining a scheduling grant channel (channel #1) from the received channel indication; (4) sending a scheduling grant message addressed to temp ID #1 over channel #1 and including a description of the allocated uplink or downlink shared channel resources; and (5) communicating data by transmitting or receiving the data on the allocated shared channel resources. Similarly, the network may simultaneously or substantially simultaneously communicate with the second UE over a scheduled shared channel using the steps of: (1) receiving a temporary identifier (temp ID #1) and a channel indication (channel indication #2); (2) allocating downlink or uplink shared channel resources; (3) determining a scheduling grant channel (channel #2) from the received channel indication; (4) sending a scheduling grant message addressed to temp ID #1 over channel #2 and including a description of the allocated uplink or downlink shared channel resources; and (5) communicating data by transmitting or receiving the data on the allocated shared channel resources.

In a similar manner to that described above with reference to FIGS. 6A, 7A and 8A, the network may further re-assign a replacement temporary identifier to one or both UEs in order that each UE is assigned a unique temporary identifier, thus potentially obviating the need for grant channel restrictions when sending scheduling grant messages to each UE. Furthermore, in some embodiments, the network may allow a UE to use a different set of SPCCH channels. For example, the network could re-assign a unique replacement temporary identifier to the UE and allowing the network to convey scheduling grants of uplink or downlink shared channel resources on any downlink SPCCH channel.

In FIG. 12, UEs communicate the channel set implicitly. A first UE derives a temporary identifier and derives a physical resource (physical resource #1) before establishing a connection with the network equipment. The physical resource may be characterized by its time, frequency and code parameters. In the embodiment shown, a UE may communication the channel set implicitly by the very use of the physical resource. The network may use one or more characteristics of the physical resource to infer the channel set to be used by the UE.

In some embodiments, the UE may determine a channel set then determine on which physical resource to send an initial message based on the determined channel set. In other embodiments, the UE may determine a physical resource to send an initial message then determine a channel set based on the determined physical resource. The network uses characteristics of the physical resource used by the UE to determine the channel set. For example, the time (e.g., time slot) of the initial message may indicate to the network that a particular downlink scheduling channel or set of channels will be monitored by the UE. Upon receipt of the temporary identifier, the network may associate the temporary identifier with a particular one or more scheduling grant channels (SPCCHs) based on one or more characteristics of the physical resource (physical resource #1). In some embodiments, the association of the temporary identifier or a physical resource with an SPCCH channel number or a channel set may vary as a function of the time. Alternatively, the association may be based upon a global UE ID received within an RRC connection request message. Each UE forms the same association between the transmitted temporary identifier and channel set as is formed by the network. This association may be accomplished similarly in both the UE and in the network. The network further associates the temporary identifier and channel set pair with a particular UE (in this case, the first UE).

Simultaneously or some time later, a second UE is shown to begin a connection establishment procedure. The second UE derives a temporary identifier and transmits an initial message to the network. Upon receipt of the initial message, the network similarly determines the channel set and associates the temporary identifier with one or more particular SPCCH channel numbers based on a characteristic of the physical resource (physical resource #2).

In some embodiments, an association between the temporary identifier and the implied channel set is based on a periodic function of time. Thus, a finite set of access period instances within the time period spanned between the sending of the two initial messages is configured such that the association between a temporary identifier and a channel set does not repeat. As such, the transmission of temp ID #1 by the second UE at a later time causes its temp ID #1 to be associated with a different SPCCH channel number of that which is associated with the first UE. In the example shown, temp ID #1 is associated with SPCCH channel #1 for the first UE, whereas temp ID #1 is associated with SPCCH channel #2 for the second UE. Thus, the network may send scheduling grant messages to a UE using a scheduling grant channel known a priori to both the UE and the network and may communicate data uniquely with the first and second UEs over one or more scheduled shared channels as indicated by the scheduling grant messages.

At this point, both UEs are associated with the same temporary identifier, however, due to their association with differing SPCCH channel numbers, unintended cross communication may be avoided as discussed above. Thus, a unique shared channel communication context has been formed by the system for each UE, attributed to the fact that the connection establishments were initiated using different physical resources and hence the UEs may be associated with different SPCCHs. In some embodiments, this method completely removes the possibility of connection for non-simultaneous access attempts within a given time period. If a plurality of UEs derives a common temporary identifier but each transmits the initial message on different physical resources, then conflicts may be avoided if the UEs are reallocated replacement temporary identifiers. On the other hand, if a plurality of UEs derives a common temporary identifier and also transmits the initial message on the same physical resources, then contentions may be experienced and conflicts may be resolved using contention resolution procedures such as described above with reference to FIGS. 9 and 10.

The length of the substantially contention-free access may be a function of the number of available SPCCH and the length and nature of the pattern describing the association between a temporary identifier and SPCCH channel number. It would therefore be advantageous for the network to assign unique replacement temporary identifiers to each UE accessing the system before the association pattern repeats in time. Thus, by designing the association pattern to have a length commensurate with the maximum expected time required to assign a replacement temporary identifier, the efficiency of the scheme may be optimized.

While the invention has been described in terms of particular embodiments and illustrative figures, those of ordinary skill in the art will recognize that the invention is not limited to the embodiments or figures described. For example, many of the embodiments described above are referenced to 3GPP systems and evolved UMTS Terrestrial Radio Access Network (E-UTRAN) nomenclature. More generally, some embodiments may include a transceiver using a code division multiple access (CDMA) transmitter/receiver pair operating in either a time division duplex (TDD) scheme or frequency division duplex (FDD) scheme. Alternatively, the transceiver may be a non-code division transceiver, such as used in a TDMA system, an FDMA system, an OFDM system or hybrids thereof (e.g. TMDA/FDMA, TDMA/CDMA, TDMA/OFDM, and TDMA/OFDM/CDMA). The transceiver may operate on bursts or may operate on a signal stream.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. A method of initiating a wireless connection and subsequent communication over a shared physical resource in a wireless communication system between user equipment and network equipment, the method, by the user equipment, comprising:

deriving a temporary identifier to be used by the network equipment to address the user equipment, wherein the temporary identifier is a function of time or radio frame number;

deriving a channel set of at least one downlink channel for the user equipment to receive communications from the network equipment;

transmitting an initial message to the network equipment, the initial message conveying the temporary identifier;

receiving a downlink message using the channel set, wherein the downlink message conveys the temporary identifier and a description of a scheduled resource on a shared channel, the scheduled resource comprising a resource allocated to the user equipment by the network equipment; and communicating data on the scheduled resource in response to the downlink message.

2. The method of claim 1, further comprising determining a physical resource having a characteristic comprising a time, frequency or code parameter, and wherein the step of transmitting the initial message to the network equipment comprises transmitting the initial message on the physical resource.

3. The method of claim 1, wherein the temporary identifier is a function of both time and radio frame number.

4. The method of claim 1, wherein the description of a scheduled resource comprises an allocation of at least one uplink or downlink shared physical resource.

5. The method of claim 1, wherein the downlink message is addressed to the temporary identifier.

6. The method of claim 1, wherein the step of transmitting an initial message to the network equipment, wherein the initial message conveys the temporary identifier, comprises transmitting an initial message to the network equipment wherein the initial message comprises the temporary identifier.

7. The method of claim 1, wherein deriving the channel set is performed before transmitting the initial message.

8. The method of claim 1, wherein deriving the channel set comprises determining the channel set based on the temporary identifier.

9. The method of claim 1, wherein deriving the channel set comprises determining the channel set as a function of one or more characteristics of a physical resource.

10. The method of claim 1, wherein the downlink message is received using the channel set wherein the channel set comprises multiple channels that the user equipment monitors for the description of the scheduled resource on the shared channel.

11. A user equipment used in initiating a wireless connection and subsequent communication over a shared physical resource in a wireless communication system between the user equipment and network equipment, the user equipment comprising:

a memory having executable program code stored therein; and a processor coupled to the memory;

wherein the program code, when executed by the processor, is operable for:

deriving a temporary identifier to be used by the network equipment to address the user equipment, wherein the temporary identifier is a function of time or radio frame number;

deriving a channel set of at least one downlink channel for the user equipment to receive communications from the network equipment;

transmitting an initial message to the network equipment, the initial message conveying the temporary identifier;

receiving a downlink message using the channel set, wherein the downlink message conveys the temporary identifier and a description of a scheduled resource on a shared channel, the scheduled resource comprising a resource allocated to the user equipment by the network equipment; and communicating data on the scheduled resource in response to the downlink message.

12. A user equipment used in initiating a wireless connection and subsequent communication over a shared physical resource in a wireless communication system between the user equipment and network equipment, wherein the user equipment is configured to:

derive a temporary identifier to be used by the network equipment to address the user equipment, wherein the temporary identifier is a function of time or radio frame number;

derive a channel set of at least one downlink channel for the user equipment to receive communications from the network equipment;

transmit an initial message to the network equipment, the initial message conveying the temporary identifier;

receive a downlink message using the channel set, wherein the downlink message conveys the temporary identifier and a description of a scheduled resource on a shared channel, the scheduled resource comprising a resource allocated to the user equipment by the network equipment; and communicate data on the scheduled resource in response to the downlink message.

13. The user equipment of claim 12, wherein the user equipment is further configured to determine a physical resource having a characteristic comprising a time, frequency or code parameter, and wherein the user equipment is configured to transmit the initial message to the network equipment by transmitting the initial message on the physical resource.

14. The user equipment of claim 12, wherein the temporary identifier is a function of both time and radio frame number.

15. The user equipment of claim 12, wherein the scheduled resource comprises at least one of an allocated uplink or downlink shared physical resource.

16. The user equipment of claim 12, wherein the downlink message is addressed to the temporary identifier.

17. The user equipment of claim 12, wherein the user equipment is configured to transmit an initial message to the network equipment, wherein the initial message conveys the temporary identifier, by transmitting an initial message to the network equipment wherein the initial message comprises the temporary identifier.

18. The user equipment of claim 12, wherein the user equipment is configured to derive the channel set by determining the channel set based on the temporary identifier.

19. The user equipment of claim 12, wherein the user equipment is configured to derive the channel set by determining the channel set as a function of one or more characteristics of a physical resource.

20. The user equipment of claim 12, wherein the user equipment is configured to receive the downlink message using the channel set wherein the channel set comprises multiple channels that the user equipment monitors for the description of the scheduled resource on the shared channel.

21. A network equipment used in initiating a wireless connection and subsequent communication over a shared physical resource in a wireless communication system between user equipment and the network equipment, wherein the network equipment is configured to:

receive an initial message sent by the user equipment wherein the initial message conveys a temporary identifier derived by a user equipment to be used by the network equipment to address the user equipment, wherein the temporary identifier is a function of time or radio frame number;

allocate a scheduled resource to the user equipment, the scheduled resource comprising a resource on a shared channel;

transmit a downlink message using a channel set derived by the user equipment, the downlink message conveying the temporary identifier and a description of the scheduled resource; and communicate data on the scheduled resource.

22. The network equipment of claim 21, wherein the network equipment is further configured to associate the channel set with the temporary identifier conveyed by the initial message.

23. The network equipment of claim 21, wherein the network equipment is further configured to determine the channel set by determining the channel set from the physical resource carrying the initial message.

24. The network equipment of claim 21, wherein the temporary identifier is a function of both time and radio frame number.

25. The network equipment of claim 21, wherein the description of a scheduled resource comprises an allocation of at least one uplink or downlink of a shared physical resource.

26. The network equipment of claim 21, wherein the network equipment is configured to transmit the downlink message using the channel set wherein the channel set comprises a single channel or multiple channels that the user equipment monitors for the description of the scheduled resource on the shared channel.

27. The network equipment of claim 21, wherein the initial message comprises the temporary identifier derived by the user equipment to be used by the network equipment to address the user equipment.

28. A method of initiating a wireless connection and subsequent communication over a shared physical resource in a wireless communication system between user equipment and network equipment, the method comprising, at the network equipment:

receiving an initial message sent by the user equipment wherein the initial message conveys a temporary identifier derived by a user equipment to be used by the network equipment to address the user equipment, wherein the temporary identifier is a function of time or radio frame number;

allocating a scheduled resource to the user equipment, the scheduled resource comprising a resource on a shared channel;

transmitting a downlink message using a channel set derived by the user equipment, the downlink message conveying the temporary identifier and a description of the scheduled resource; and communicating data on the scheduled resource.

29. The network equipment of claim 28, wherein the network equipment is further configured to associate the channel set with the temporary identifier conveyed by the initial message.

30. The method of claim 28, wherein the temporary identifier is a function of both time and radio frame number.

31. The method of claim 28, wherein the description of a scheduled resource comprises an allocation of at least one uplink or downlink shared physical resource.

32. The method of claim 28, wherein the downlink message is transmitted using the channel set wherein the channel set comprises a single channel or multiple channels that the user equipment monitors for the description of the scheduled resource on the shared channel.

33. The method of claim 28, wherein the initial message comprises the temporary identifier derived by the user equipment to be used by the network equipment to address the user equipment.

34. A control circuit for use in user equipment used in initiating a wireless connection and subsequent communication over a shared physical resource in a wireless communication system between the user equipment and network equipment, wherein the control circuit is configured to:

derive a temporary identifier to be used by the network equipment to address the user equipment, wherein the temporary identifier is a function of time or radio frame number;

derive a channel set of at least one downlink channel for the user equipment to receive communications from the network equipment;

transmit an initial message to the network equipment, the initial message conveying the temporary identifier;

receive a downlink message using the channel set, wherein the downlink message conveys the temporary identifier and a description of a scheduled resource on a shared channel, the scheduled resource comprising a resource allocated to the user equipment by the network equipment; and communicate data on the scheduled resource in response to the downlink message.

35. The control circuit of claim 34, wherein the control circuit is further configured to determine a physical resource having a characteristic comprising a time, frequency or code parameter, and wherein the control circuit is configured to transmit the initial message to the network equipment by transmitting the initial message on the physical resource.

36. The control circuit of claim 34, wherein the temporary identifier is a function of both time and radio frame number.

37. The control circuit of claim 34, wherein the scheduled resource comprises at least one of an allocated uplink or downlink shared physical resource.

38. The control circuit of claim 34, wherein the downlink message is addressed to the temporary identifier.

39. The control circuit of claim 34, wherein the initial message conveys the temporary identifier, by transmitting an initial message to the network equipment wherein the initial message comprises the temporary identifier.

40. The control circuit of claim 34, wherein the control circuit is configured to derive the channel set by determining the channel set based on the temporary identifier.

41. The control circuit of claim 34, wherein the control circuit is configured to derive the channel set by determining the channel set as a function of one or more characteristics of a physical resource.

42. The control circuit of claim 34, wherein the control circuit is configured to receive the downlink message using the channel set wherein the channel set comprises multiple channels that the user equipment monitors for the description of the scheduled resource on the shared channel.

\* \* \* \* \*